United States Patent [19]

Nakano et al.

[11] Patent Number: 5,056,031
[45] Date of Patent: Oct. 8, 1991

[54] APPARATUS FOR DETECTING THE COLLISION OF MOVING OBJECTS

[75] Inventors: Masaru Nakano; Minoru Tanaka; Toshiaki Ikeda; Toshitaka Kuno, all of Aichi, Japan

[73] Assignee: Kabushiki Kaisha Toyota Chuo Kenyusho, Aichi, Japan

[21] Appl. No.: 435,070

[22] Filed: Nov. 9, 1989

[30] Foreign Application Priority Data

Nov. 12, 1988 [JP] Japan .................. 63-286347

[51] Int. Cl.$^5$ ................................. B25J 9/00
[52] U.S. Cl. ........................ 364/461; 364/513; 364/474.2
[58] Field of Search ............ 364/460, 461, 513, 474.2

[56] References Cited

U.S. PATENT DOCUMENTS

| | | | |
|---|---|---|---|
| 4,578,757 | 3/1986 | Stark | 364/461 |
| 4,888,707 | 12/1989 | Shimada | 364/513 |
| 4,922,430 | 5/1990 | Wavish | 364/461 |

FOREIGN PATENT DOCUMENTS 0268317 5/1988 European Pat. Off. .

Primary Examiner—Thomas G. Black
Attorney, Agent, or Firm—Oblon, Spivak, McClelland, Maier & Neustadt

[57] ABSTRACT

An apparatus for detecting the collision of objects including a moving object includes a face information memory for storing face information describing the surfaces of each object; hierarchical sphere model generator for modeling the surfaces of each object by hierarchically covering the surfaces with spheres having various radii on the basis of the face information; sphere model memory for storing the positions of the modeled spheres generated; sphere position updater for updating the position of each modeled sphere having various radii with respect to the moving object and outputting the updated position; and sphere collision computer for executing procedures in which mutually colliding spheres are detected on the basis of the positions of the modeled spheres concerning two of the objects generated at an arbitrary time and stored in the sphere model memory and colliding spheres among spheres belonging to the mutually colliding spheres and having a smaller radius are further detected with respect to only the spheres determined to collide with each other, and for determining the collision of the two objects with each other when finally mutually colliding spheres having the smallest radius are present. The procedures are executed hierarchically and consecutively starting with spheres having a large radius toward spheres having a smaller radius.

16 Claims, 14 Drawing Sheets

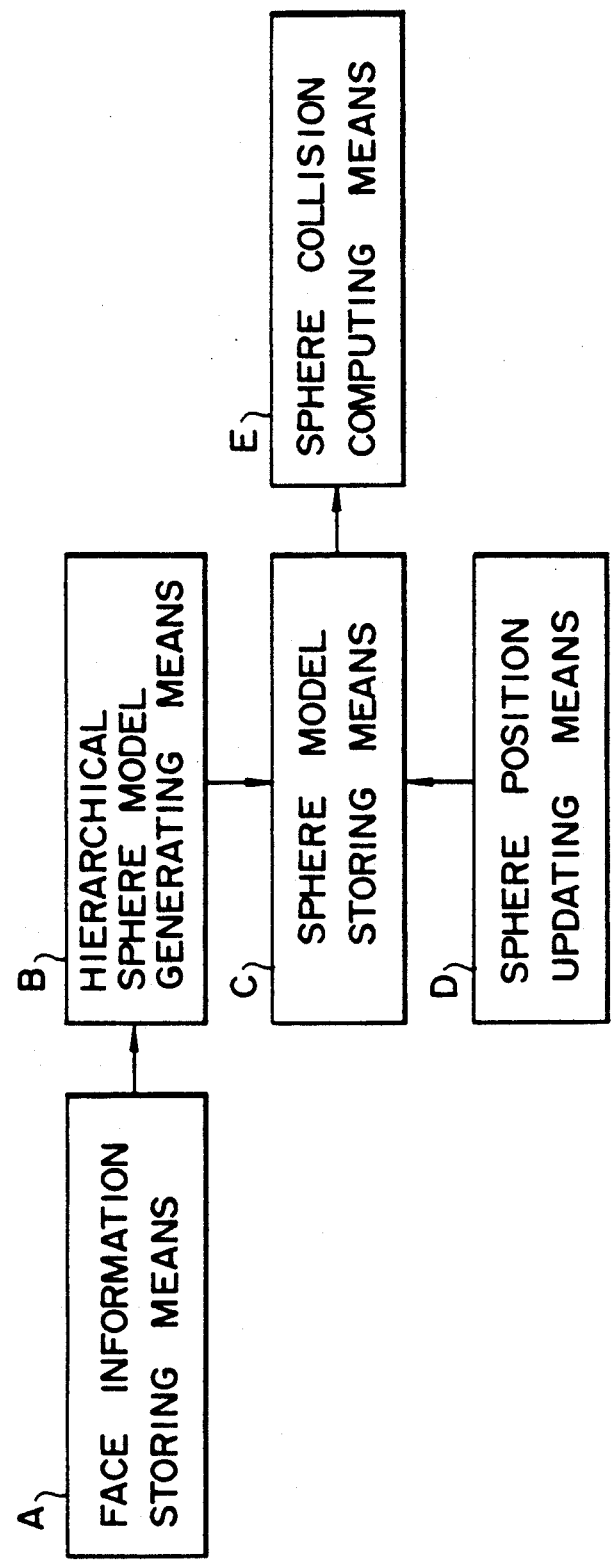

| FIG. 3(a) |
| FIG. 3(b) |

APPARATUS FOR DETECTING THE COLLISION OF MOVING OBJECTS

BACKGROUND OF THE INVENTION

1. Field of the Invention

The present invention relates to an apparatus for detecting the collision of a moving object at fast speed and with high accuracy, and is applicable to, for instance, a system for confirming the safety of motion of a taught robot by means of a graphic simulator or the like, a system for determining a collision in the motion of a robot in real time, a system for determining the collision in an unmanned car in real time, or other similar systems.

2. Statement of the Related Art

Conventionally, in the determination of collision of a robot, for instance, a graphic simulator is known which is adapted to display on a screen the configuration of a robot at various positions in a path of its movement or continuously display the motion of a programmed robot on a screen. In this apparatus, the continuous motion of a robot is displayed at an actual moving speed and its motion is simulated, and it is necessary to detect the presence of collisions between two moving robot arms and between the robot arm and a stationary object with high accuracy and at high speed.

Various types of methods are known as methods of determining the collision.

For instance, the following various methods are known: As a first method, as disclosed in Japanese Patent Laid-Open No. 43706/1987, the members of a robot and the work environment are covered with polyhedrons, and the presence of a collision is determined from projected figures of the polyhedrons. As a second method, as disclosed in Japanese Patent Laid-Open No. 99591/1975, the members of a robot and the work environment are expressed by line segments, and the distance between the line segments is computed to determine the presence of a collision. As a third method, as disclosed in the Journal of Robotics Society of Japan, Vol. 6, No. 1, p. 35, the position of movement of a robot or an object in the environment is expressed as a function of time, and the collision between a vertex and a plane or between two edges is determined to be a collision on the basis of that function.

In addition, as disclosed in the Journal of Robotics Society of Japan, Vol. 5, No. 3, p. 21, a fourth method is known in which a robot and an object in the environment are approximated hierarchically by cubes having different sizes, and a collision is determined by checking the relationship of inclusion of the cubes of the two objects. Furthermore, as disclosed in a collection of papers for the 6th Annual Conference of Robotics Society of Japan, p. 105, a fifth method is known in which a robot and an object in the environment are approximated hierarchically by spheres having different radii, and the relationship of inclusion of the spheres having different radii is checked so as to determine the collision of an object.

However, the following drawbacks are experienced with the above-described conventional methods. For instance, with the aforementioned first method, it is impossible to effect collision detection with high accuracy in cases where a member is a concave cube and it is therefore difficult to approximate its shape with a mere cylinder or rectangular parallelepiped. With the second method, although a high-speed determination is possible, modelling is too simple so that the accuracy of collision determination is not good, while, with the third method, the amount of computation becomes large with an increase in the number of faces, resulting in an extreme delay in the processing speed.

In addition, the fourth method has a problem in that although it is based on the technique of a hierarchical structure using a so-called octo tree, since an approximation to a cube is required, the coordinate conversion for expressing a continuously moving object is complicated and takes time. Furthermore, in accordance with the fifth method, a robot and an object in the environment are approximated hierarchically by spheres having different radii so as to simplify the coordinate conversion. As for the method of generating a sphere in a lower rank, however, a regular polyhedron inscribing an upper rank is first determined and the sphere is then determined as one which circumscribes the faces constituting the regular polyhedron and whose center corresponds to the center of gravity of that polyhedron, so that there has been a drawback in that the mechanism of generating the spheres in the lower rank becomes complicated and modeling takes time. Also, there is an additional drawback in that the modeling efficiency is poor and hence modeling takes time due to such causes as an increased number of overlapping areas between spheres, the occurrence of a lower-rank sphere which includes an outer portion of an upper, rank sphere, and the occurrence of a case in which the same sphere belongs to two different upper-rank spheres, or a sphere belongs to a sphere located in an immediately higher rank but does not belong to a sphere located in a rank of a level above two ranks. Furthermore, there is a drawback in that since spheres of a hierarchical structure are generated uniformly with respect to the interior and exterior of objects that are not necessary for describing the shapes of objects subject to modeling, the number of spheres generated becomes numerous, thereby deteriorating the modeling efficiency. Moreover, although the accuracy depends on the radius of the smallest spheres, and the computing speed of collision detection depends on the frequency of determination of collisions between the spheres, i.e., the hierarchical structure of the spheres, since the ratio of radius between the spheres in the mutually adjacent layers is restricted to a fixed ratio, it is difficult to arbitrarily change the hierarchical structure and the radius of the smallest spheres. Hence, the adjustment of the accuracy and the computing speed becomes difficult.

SUMMARY OF THE INVENTION

Accordingly, an object of the present invention is to provide an apparatus for detecting the collision of a moving object which is capable of decreasing the frequency of collision determination between spheres and effecting the collision determination of an object at high speed with excellent accuracy by improving the modelling speed of an object and simplifying the hierarchical structure of the spheres, thereby overcoming the above-described drawbacks of the conventional art.

To this end, in accordance with the present invention, as illustrated in FIG. 1, there is provided an apparatus for detecting the collision of objects including at least one moving object, comprising: face information storing means A for storing face information describing the surfaces of each of the objects; hierarchical sphere model generating means B for modeling the surfaces of each of the objects by hierarchically covering the surfaces with spheres having a plurality of radii on the basis of the face information; sphere model storing means C for storing the positions of the modeled spheres generated; sphere position updating means D for updating the position of each of the modeled spheres having the plurality of radii with respect to the moving object- in correspondence with the movement of the moving object and outputting the updated position to the sphere model storing means C; and sphere collision computing means E for executing procedures in which mutually colliding ones of the spheres are detected on the basis of the positions of the modeled spheres concerning two of the objects generated at an arbitrary time and stored in the sphere model storing means, and colliding spheres among spheres belonging to the mutually colliding spheres and having a smaller radius are further detected with respect to only the spheres determined to collide with each other, the procedures being executed hierarchically and consecutively starting with spheres having a large radius toward spheres having a smaller radius, and for determining the collision of the two objects with each other when finally mutually colliding spheres having the smallest radius are present.

The face information storing means A is a means for storing information concerning flat and/or curved surfaces constituting the surfaces of an object, and is a device adapted to store functions of component flat and/or curved surfaces.

The hierarchical sphere model generating means B is a means for generating spheres respectively covering the surfaces of objects determined on the basis of the aforementioned face information, and for generating the positions of the spheres. Specifically, the hierarchical sphere model generating means B is adapted to model an object by covering its surfaces with hierarchical spheres by hierarchically covering the surfaces of the object with spheres having a predetermined number of ranks and predetermined radii. This means B may comprise means for determining radii of spheres in medium ranks between an uppermost rank and a lowermost rank on the basis of a radius of the uppermost rank sphere circumscribing the objects and a radius of the lowermost rank smallest sphere which determines a predetermined accuracy of a collision detection, and hierarchically arranging the spheres so that the larger spheres include the smaller spheres and the surfaces of the objects. Further, radii of spheres in each rank and the number of ranks may be determined on the basis of the radius of the uppermost rank sphere, the radius of the lowermost rank sphere and further a ratio of radius between an upper rank sphere and a lower rank sphere.

The sphere model storing means C is a means for storing the positions of the spheres in each rank generated, e.g., the central positions and radii thereof.

The sphere position updating means D is a means for updating the positions of the spheres in each rank in correspondence with the movement of the object and storing the updated data on the positions in the sphere model storing means C. For instance, the position and posture of an object can be described by the parallel movement and rotational movement of a coordinate system fixed to the object, and this parallel movement and the rotational movement can be expressed by one transformation matrix. Accordingly, the central position of each sphere, as viewed from its absolute coordinate system, after movement can be obtained by multiplying the central position as viewed in the coordinate system fixed to each object by the aforementioned transformation matrix.

The sphere collision computing means E is a means for computing the presence of a collision between objects and their colliding positions on the basis of the positions of the spheres stored in the sphere model storing means C at the time when an object moves. More specifically, a determination is made as to the presence of a collision of a sphere having the largest radii between two objects. i.e., the sphere in the uppermost layer. For instance, this collision determination is made as a result of whether or not the distance between the central positions of the two spheres is smaller than the sum of the radii of the spheres. In addition, when a determination is made that no collision exists, a collision determination is made between other spheres. On the other hand, if a determination is made that a collision exists, a determination of the presence of a collision is similarly carried out for a sphere having a next smaller radius belonging to that sphere, i.e., a sphere in an immediately lower rank. If a determination is made that a collision exists, collision determinations are consecutively made with respect to spheres in a further lower rank belonging to that colliding sphere. On the other hand, when no colliding sphere exists among the spheres in a given rank, the operation is carried out for a rank which is one level higher, and computation for detecting a colliding sphere in that rank is carried out. If a colliding sphere is found, a collision determination is made for spheres in a further lower rank through the above. described procedures, and, if no colliding sphere is present, the operation is carried out for a further higher rank, and computation for detecting a colliding sphere is similarly performed. Then, when mutually colliding spheres having the smallest radius are finally present, it is determined that the two objects collide with each other. Further, when necessary, the colliding positions of the two objects may be determined on the basis of the positions of the mutually colliding spheres having the smallest radius.

According to the present invention, as described above, the surfaces of objects are modeled by being covered with spheres, while the interior and exterior of objects are excluded from being modeled. Therefore, the hierarchical structure of the spheres is simplified and the modeling speed of the objects is improved due to the reduced number of spheres. As a result, the time for computation of a collision detection is reduced.

Since the modeling is conducted by means of spheres, the movement of the spheres accompanying the movement of the object can be computed merely by computing the movement of central positions of the spheres, thereby simplifying a computation of updated spheres.

Further, since the accuracy of collision determination depends on the radius of a smallest sphere which can be arbitrarily set, the accuracy of collision determination can be arbitrarily changed.

The time for computation can be reduced by increasing the number of ranks in a hierarchical modeling.

Furthermore, the speed of collision determination is improved, since a collision determination of the spheres is hierarchically conducted starting with spheres in an upper rank having a high possibility of collision toward spheres in a lower rank belonging to the colliding spheres. Namely, it is possible to efficiently determine a collision generating portion by excluding the portions being unlikely to collide during the process of rough detection toward fine detection.

In the present invention, collision detection means judge which objects collide or may collide and at which position objects collide or may collide by detecting a degree of approximation between spheres covering surfaces of objects.

The above and other objects, features and advantages of the present invention will become more apparent from the following detailed description of the invention when read in conjunction with the accompanying drawings.

BRIEF DESCRIPTION OF THE DRAWINGS

FIG. 1 is a block diagram illustrating an overall structure of the present invention;

FIGS. 12a, 12(a)-1 and 12(a)-2 show a flowchart of the procedure of processing by a CPU for searching colliding spheres.

DESCRIPTION OF THE PREFERRED EMBODIMENTS

Referring now to the accompanying drawings, a description will be given of the preferred embodiments of the present invention.

First Embodiment

Figure 2:
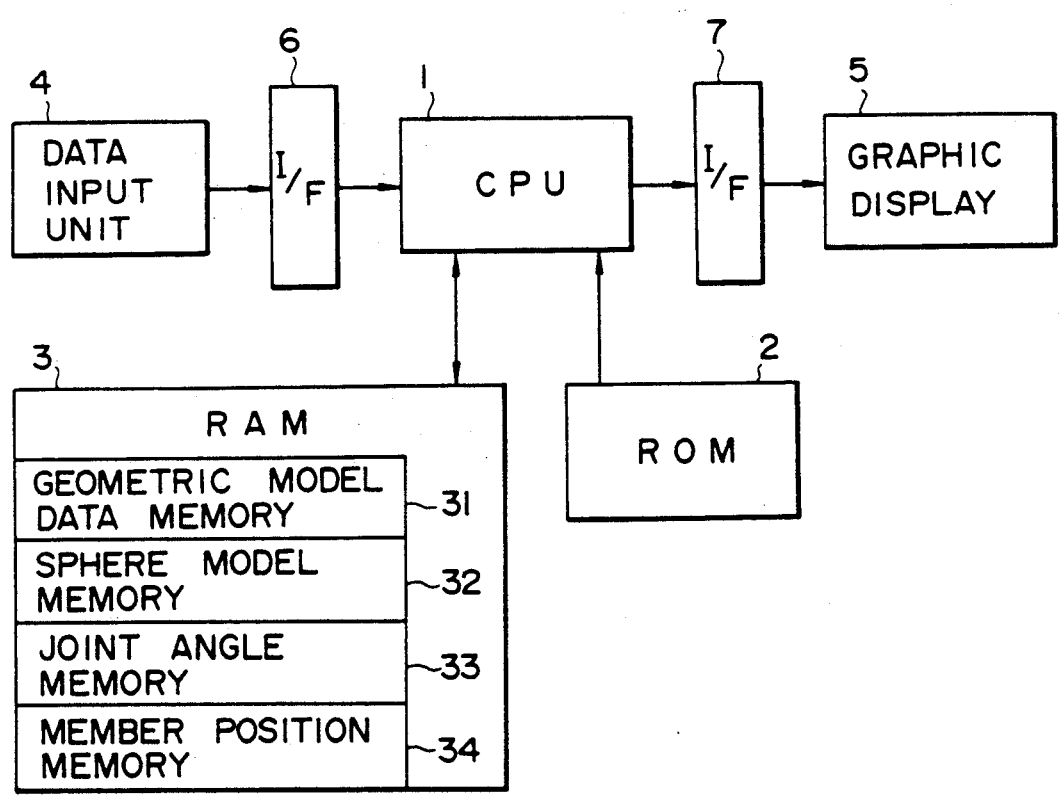
FIG. 2 is a block diagram illustrating a structure of an apparatus in accordance with a specific embodiment of the present invention.

FIG. 2 illustrates an apparatus for detecting the collision of a moving body in accordance with a first embodiment of the present invention in which the collision between robots or between a robot and an object is detected when data on configurations and positions concerning the robot and a work environment is input, and the robot(s) and the work environment are displayed on a graphic display so as to simulate the motion of the robot(s).

As shown in FIG. 2, this apparatus is constituted by a computer apparatus comprising the following units: a CPU 1 for executing logical operations and the like; a ROM 2 in which a program specifying processing procedure thereof is stored; a RAM 3 for storing various data; a data input unit 4 for inputting positional and geometric model data of a robot and a work environment and imparting various commands including a simulation start command; a graphic display 5 on which the configuration of a robot and the work environment which change with time are displayed for each fine sampling time; and input/output interfaces 6, 7 for connecting the data input unit 4 and the graphic display 5 to the CPU 1. In addition, the following are formed in the RAM 3: a geometric model data memory 31 for storing information on faces, vertices, and edges describing the geometric model of each component member of the robot arm and the work environment; a sphere model memory 32 for storing information concerning the central position and radius of each sphere and ranks when the surfaces of the component member are converted into a hierarchical structure; a joint angle memory 33 for storing the present joint coordinates of the robot; and a member position memory 34 for storing the present position of each component member of the robot and the work environment.

Figures 3, 3A:
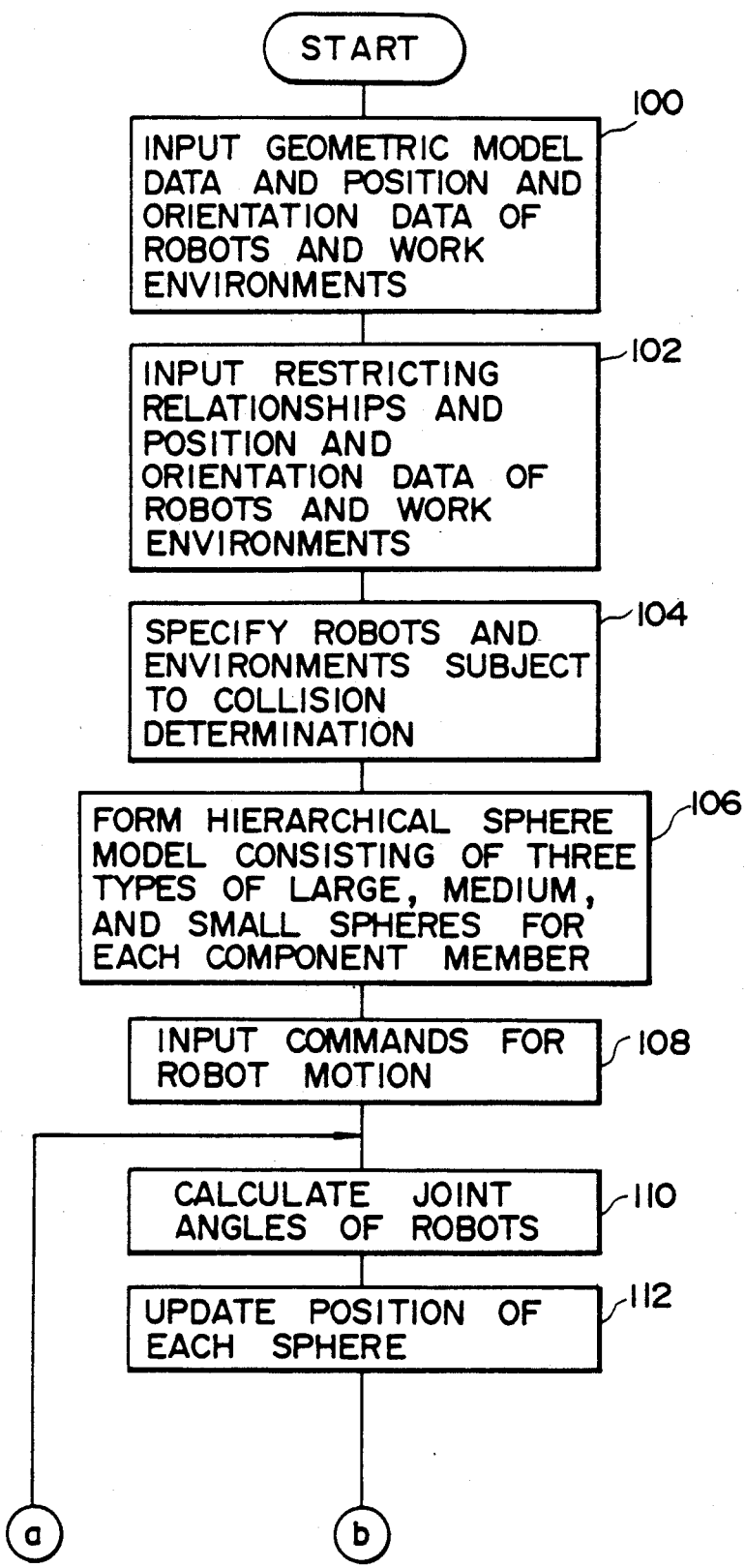
FIGS. 3, 3(a) and 3(b) show is a flowchart of the procedure of processing by a CPU used in the apparatus of the embodiment.
Figure 3B:
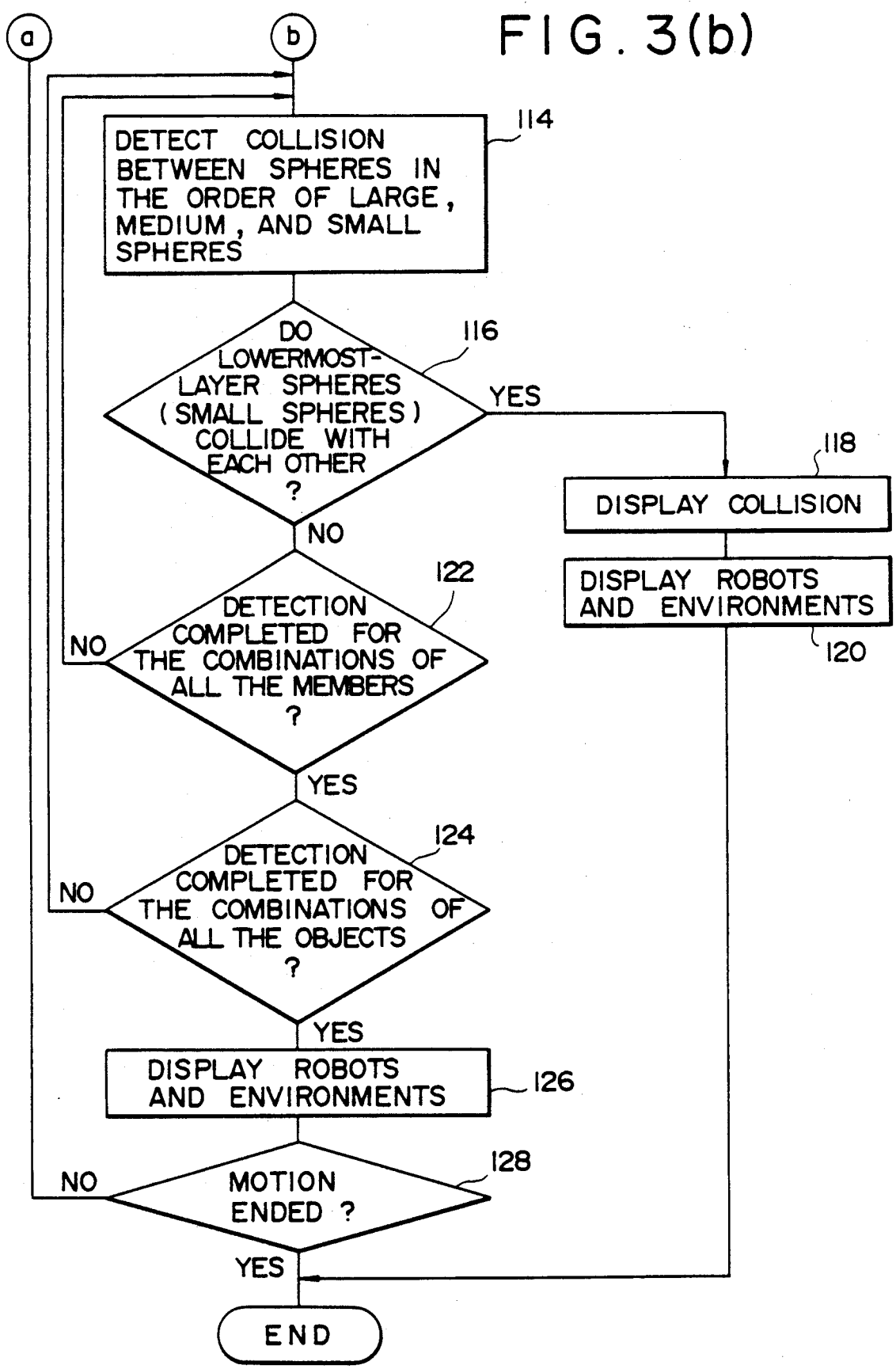

A description will now be given of the operation of this apparatus with reference to the flowchart of FIG. 3 illustrating the processing procedures of the CPU 1.

In Step 100, data for generating the respective geometric models of the component members of the robots and the work environments is first input from the data input unit 4. Through this input, data on the vertices, edges, faces, etc., representing the geometric model of each component member is computed. This geometric model data is stored in the geometric model data memory 31.

In Step 102, data concerning restricting relationships of the component members of the robots and the work environments and their positions and orientations on absolute coordinates is input from the data input unit 4. As this data is input, the robots and the work environments are adapted to be displayed on the graphic display 5 so that the detection of input data errors and the inputting of data can be executed easily. Then, the data on the positions and restricting relationships between the robots and the work environments is stored in the member position memory 34.

Upon completion of the inputting of positional data in Step 102, data specifying the robots and the work environments which are subject to collision are input by the data input unit 4 in Step 104.

In Step 106, the surfaces of the component members of the robots and the work environments specified in Step 104 for each component member are hierarchically covered with the three types of large, medium, and small spheres to effect hierarchical sphere modeling of the surfaces. The sphere modeling of the surfaces is carried out as follows.

Figure 4:
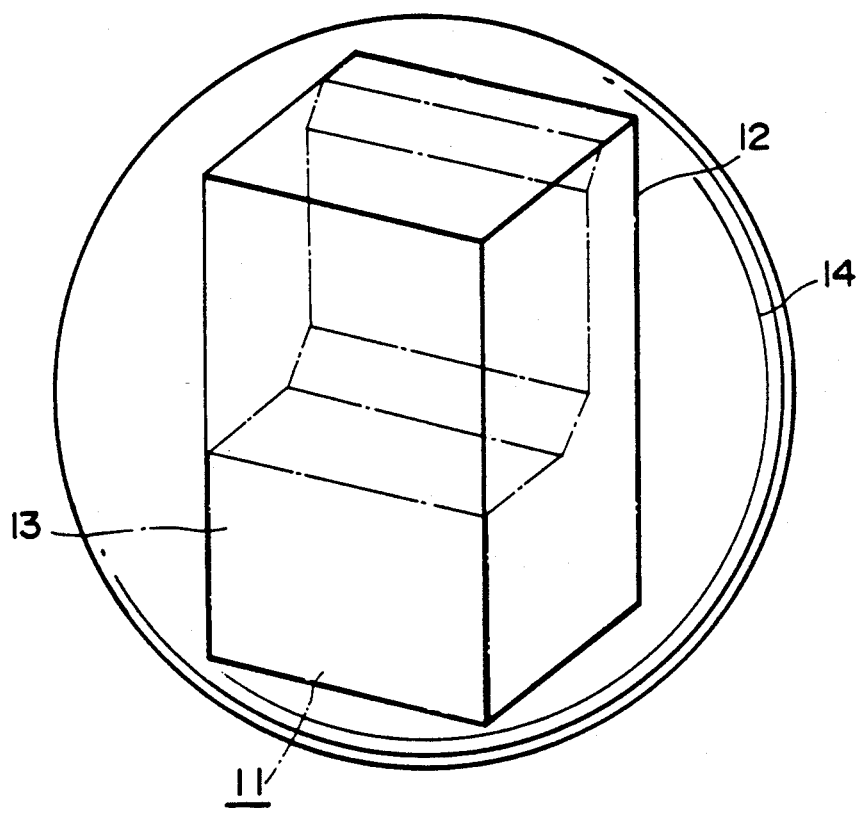
FIGS. 4, 5(a) to 5(c) and 6(a) to 6(c) are explanatory diagrams illustrating the method of generating large spheres, medium spheres and small spheres, respectively.

As shown in FIG. 4, a rectangular parallelepiped-shaped envelope 12 enveloping a component member 11 is generated from face information data by referring to the geometric model data memory 31 concerning the component member 11. Furthermore, a sphere circumscribing the envelope 12 is conceived, and that sphere is set as a large sphere 14. Thus, the large sphere 14 in the uppermost rank is generated as a sphere enveloping the component member 11. Then, the central position and radius of the large sphere 14 as viewed from reference coordinates concerning the component member 11 are stored in the sphere model memory 2.

Figure 5A:
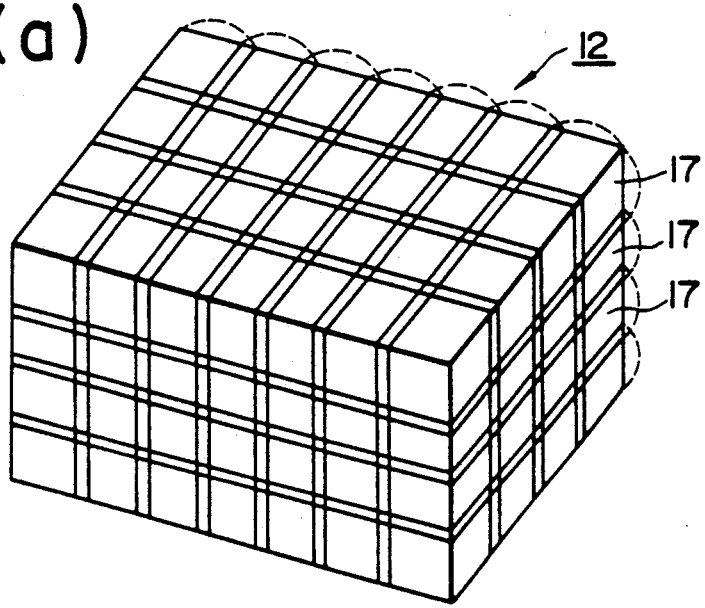
Figure 5B:
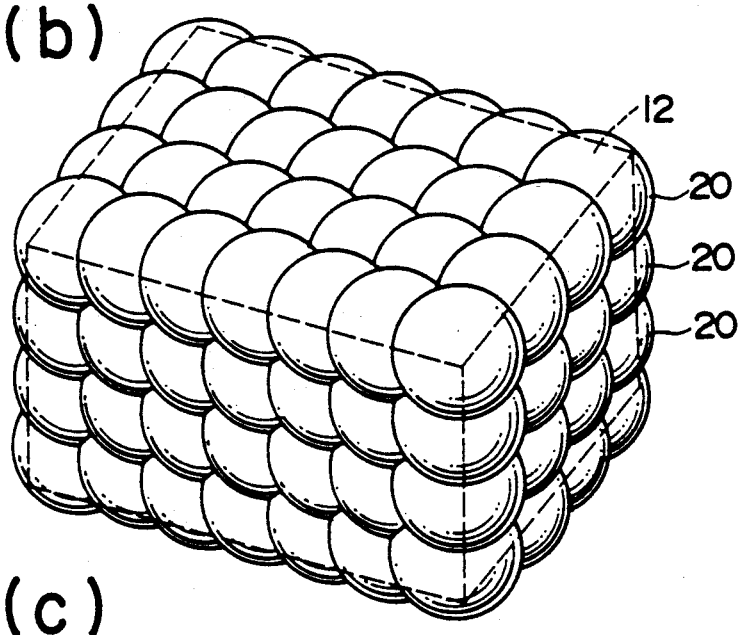
Figure 5C:
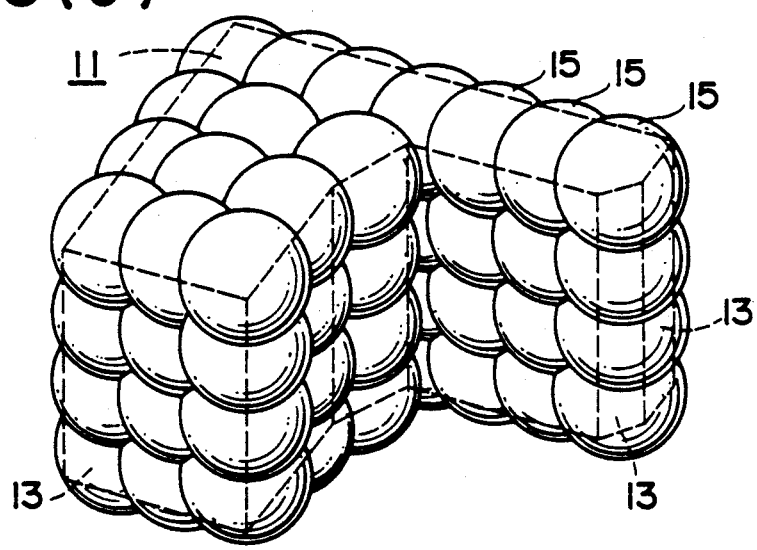

Then, as shown in FIG. 5(a) the envelope 12 is divided into a plurality of cubic cells 17 each having an edge of $lm = \sqrt{2}\, rm$ with respect to a radius rm of a medium sphere 15. Since the length of each edge of the envelope 12 is not necessarily a multiple of the length of the edge of the cell 17, the cells 17 are arranged in such a manner as to overlap each other. Then, as shown in FIG. 5(b) spheres 20 circumscribing each cell 17 are generated, and only those spheres that intersect with a surface 13 of the component member 11 among the spheres 20 are extracted, and these extracted spheres are set as medium spheres 15. Then, the central positions of the medium spheres 15 as viewed from the reference coordinates concerning the component member 11 are stored in the sphere model memory 32.

Figure 6A:
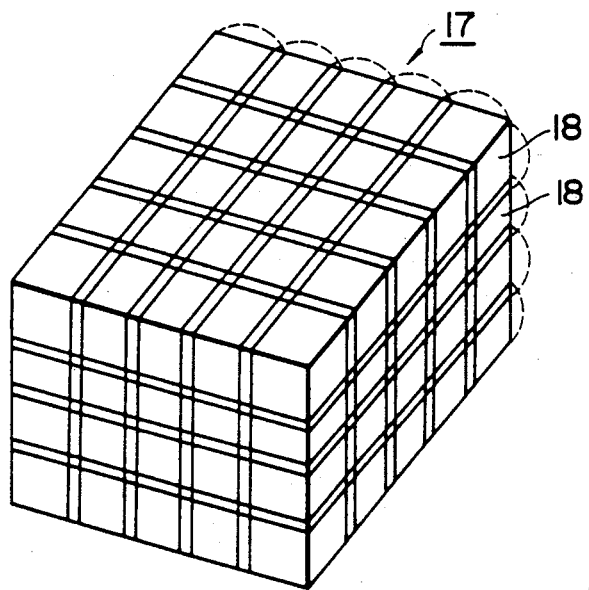
Figure 6B:
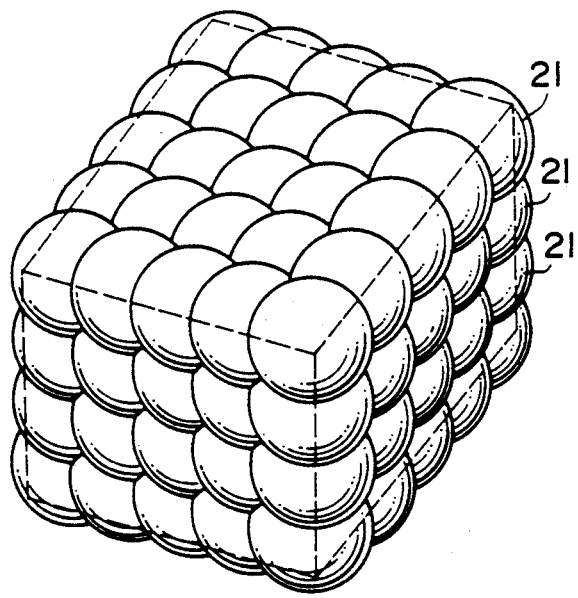
Figure 6C:
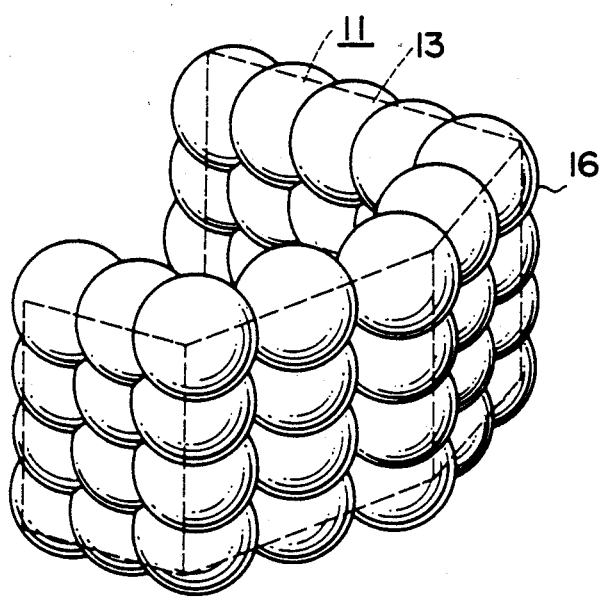

Subsequently, as shown in FIG. 6(a) attention is focused on the cells 17 each inscribing the medium sphere 15, and each of the cells 17 is divided into cubic cells 18 each having an edge of $ls = \sqrt{2}\, rs$ assuming that the radius of a small sphere is rs. At this time, the cells 18 are arranged in such a manner as to overlap each other as at the time of the generation of the medium spheres. Then, spheres 21 circumscribing these cells 18 are generated, and only those spheres that intersect the surface 13 of the component member 11 are extracted, the extracted spheres being set as small spheres 16. Subsequently, the central positions of the small spheres 16 as viewed from the reference coordinates concerning the component member 11 are stored in the sphere model memory 32.

Figure 7:
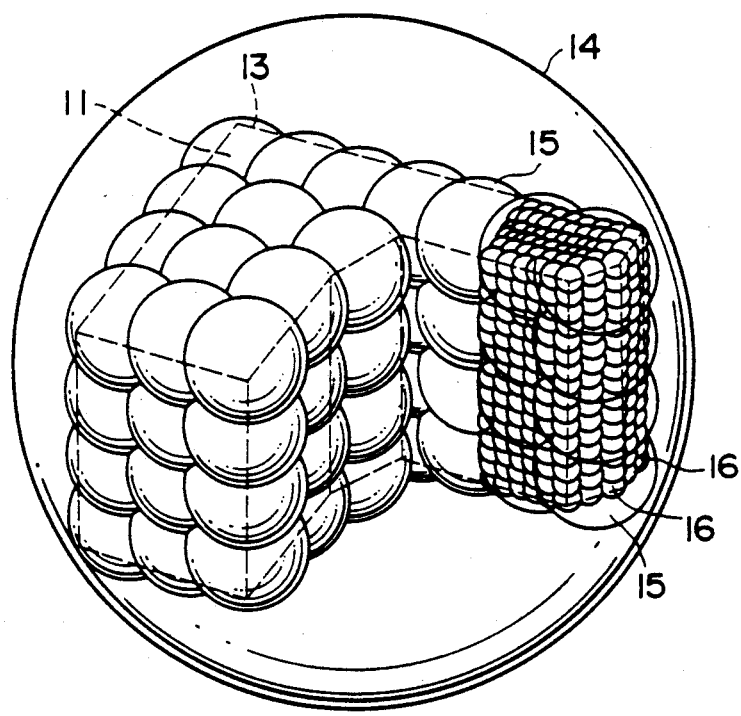
FIGS. 7 and 8 are diagrams illustrating a hierarchical structure of a sphere model.

Thus, as shown in FIG. 7, the component member 11 is hierarchically modeled by means of the three types of spheres having different radii, the large sphere 14 enveloping the entire body, the medium spheres 15 which are smaller than the same and include the surface 13 of the component member 11, and the small spheres 16 which are far smaller. Namely, it can be appreciated from FIG. 8 that the spheres are formed into a hierarchical structure in the form of a tree in which all the small spheres belong to any one of the medium spheres, and all the medium spheres belong to the large sphere.

The radius rs of the small sphere 16 is set arbitrarily by taking the accuracy of collision determination into consideration. Then, the radius rm of the medium sphere 15 can be determined automatically from the following formula on the basis of the radius rl of the large sphere and the radius rs of the small sphere:

$$rm = \sqrt{rl \cdot rs}$$

According to this formula, it is possible to equalize the ratios of volume between the small sphere and the medium sphere and between the medium sphere and the large sphere. As a result, it is possible to obtain a hierarchical structure having good efficiency in retrieval at the time of collision determination.

In addition, as an exception, in a case where the radius of the large sphere 14 is smaller than the given radius of a small sphere 16 due to the fact that the outer dimensions of the component member 11 are small, the generation of the small spheres 16 are not effected, and the modeling is carried out with the large spheres 14 alone.

When the hierarchical sphere modeling for the respective component members is completed as described above, the process proceeds to Step 108 to input a motion command for the robot from the data input unit 4. Then, the operation proceeds to Step 110 in which joint coordinates of the robot after fine movement, i.e., a joint angle, is computed in correspondence with a fine movement motion concerning an interpolation point. The joint angle data is stored in the joint angle memory 33. Subsequently, upon completion of the computation of the joint angle, the operation proceeds to Step 112 in which a transformation matrix T, which allows the reference coordinate system and the absolute coordinate system concerning each component member to be related to each other, is computed on the basis of the joint angle at that time. The transformation matrix T is one in which the position and the orientation as viewed from the absolute coordinates of the reference coordinates concerning each component member composing the robot or the work environment are expressed by a matrix of 3×4. Then, if it is assumed that a vector describing the central position of each sphere as viewed from the reference coordinates concerning each component member is Prel, the vector Pabs describing the central position of each sphere as viewed from the absolute coordinates can be determined on the basis of the following formula:

$$\begin{bmatrix} Pabs \\ 1 \end{bmatrix} = T \times \begin{bmatrix} Prel \\ 1 \end{bmatrix}$$

With respect to an object such as a robot whose component members move, it is necessary to calculate the transformation matrix T on the basis of each joint angle each time it moves and to update the absolute coordinates of the central positions of all the spheres modeling the component members. However, as for the updating of the absolute coordinates, in order to make the calculation efficient, the updating may be effected with respect to only the spheres that are subject to collision detection.

Thus, stored in the sphere model memory 32 are the central positions Prel of the spheres as viewed from the reference coordinates concerning the component members and the central positions Pabs of the spheres as viewed from their absolute coordinates at the present time.

Next, the operation proceeds to Step 114 to execute the computation of collision detection through the following procedures.

In Step 114, the detection of collision between the spheres is performed hierarchically in the order of the large spheres, medium spheres, and small spheres. If it is determined in Step 116 that collision is present among the spheres in the lowermost rank (small spheres), the operation proceeds to Step 118 in which the occurrence of collision and a colliding portion are determined and displayed on the basis of the central positions of the mutually colliding small spheres. Then, in Step 120, the robots and the work environments in a colliding state are displayed, thereby completing this program.

The procedures of hierarchical detection using the large spheres, medium spheres, and small spheres in Step 114 will be shown below.

Figure 9A:
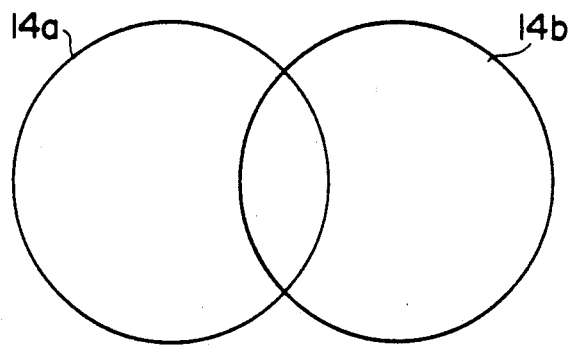
FIGS. 9(a) to 9(e) are explanatory diagrams illustrating the logic of collision determination.

Step 1: As shown in FIG. 9(a) large spheres 14a, 14b are checked, and if there is any collision, Step 2 is executed. If there is no collision, the detection is completed. Accordingly, until the components members approach each other to a certain extent, collision detection of large spheres is first carried out, so that the computation time is extremely short.

Figure 9B:
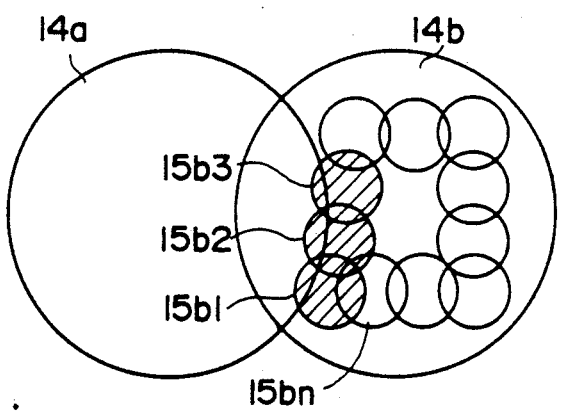

Step 2: As shown in FIG. 9(b) the detection of a collision between one large sphere 14a and medium spheres 15b1-15bn included in the opposite large sphere 14b is executed, and the colliding medium spheres 15b1, 15b2, 15b3 are extracted. Conversely, the detection of a collision between the large sphere 14b and medium spheres 15a1-15an included in the opposite large sphere 14a is executed, and colliding medium spheres 15a1, 15a2 are extracted. If there is no colliding medium sphere, it is determined that the two component members do not collide with each other, so that the computation is suspended.

Figure 9C:
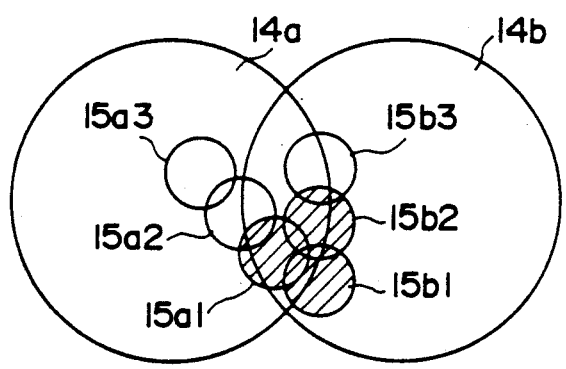

Step 3: As shown in FIG. 9(c) collision detection with respect to the extracted medium spheres $15b1$, $15b2$, $15b3$, $15a1$, $15a2$ is carried out, the mutually colliding medium spheres $15b1$, $15b2$, $15a1$ are extracted, and Step 4 is executed. On the other hand, if there is no mutually colliding medium sphere, a determination is made that the two component members do not collide with each other, and the detection computation is suspended.

Figure 9D:
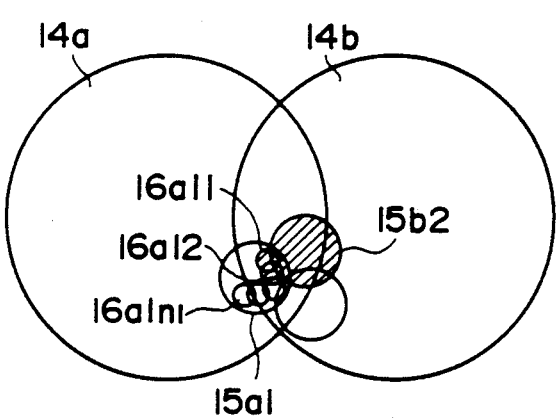

Step 4: As shown in FIG. 9(d), the detection of a collision between one colliding medium sphere $15b2$ and small spheres $16a11-16a1n_1$ included in the opposite medium sphere $15a1$ is carried out, and the colliding small spheres $16a11$, $16a12$ are extracted. Conversely, the detection of a collision between one colliding medium sphere $15a1$ and small spheres $16b21-16b2n_2$ included in the opposite medium sphere $15b2$ is carried out, and the colliding small spheres are extracted, and an ensuing Step 5 is executed. In addition, if there is no colliding small sphere, collision determination between the medium sphere $15b1$ and the small spheres $16a11-16a1n_1$ belonging to the opposite medium sphere $15a1$ is similarly carried out. When no colliding small sphere is detected, collision determination is similarly executed with respect to the other mutually colliding medium spheres, and if there ceases to be no mutually colliding medium sphere, a determination is made that the two component members do not collide with each other.

Figure 9E:
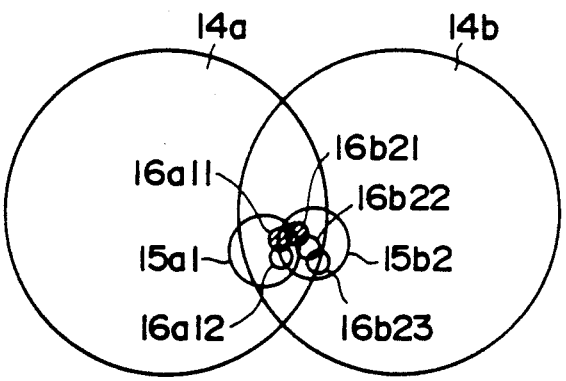

Step 5: As shown in FIG. 9(e) detection is carried out among the extracted small spheres $16a11$, $16a12$, $16b21$, $16b22$, $16b23$, and the mutually colliding small spheres $16a11$, $16b21$ are extracted. In this case, a determination is made that the two component members collide with each other at portions of the small spheres $16a11$, $16b21$. On the other hand, if there is no mutually colliding small sphere, the process returns to the step of extracting other mutually colliding medium spheres.

Figure 8:
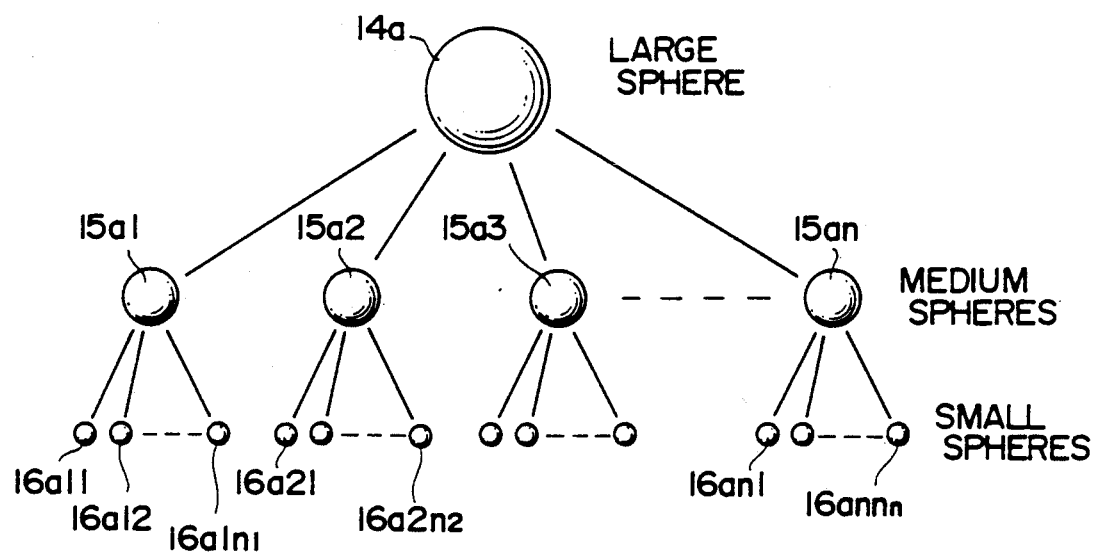

In the final analysis, when mutual collision between small spheres in the lowermost rank is detected, a determination is made that there is collision, and the positions of those small spheres are determined to be the colliding portions. When there is no mutual collision between small spheres, processing for other mutually colliding medium spheres in an upper rank is executed, and if no mutually colliding medium sphere exists, it is finally determined that there is no collision. Accordingly, the tree structure shown in FIG. 8 is retrieved along branches where collision are likely to occur, and by determining the mutual collision of all the small spheres in a uniform manner, the time for collision determination can be shortened by a substantial degree.

The collision determination of a sphere is carried out by determining whether or not the following formula can be met if it is assumed that the radii of two spheres are $r_1$, $r_2$ and their central positions $P_1$, $P_2$, respectively;

$$r_1 + r_2 \geq \| P_1 - P_2 \|$$

If the above formula is met, it is assumed that the two spheres collide with each other.

Through the above-described hierarchical detection of the large, medium, and small spheres, it is possible to effectively narrow down the portions of occurrence of collision and to effect collision detection with ease and at high speed.

If it is determined in Step 116 that collision does not take place between the spheres in the lowermost rank, it means that collision does not take place between the component members. As a result, the process proceeds to Step 122 in which a determination is made as to whether or not a computation has been made concerning collision detection with respect to the combinations of all the component members. If the computation has not been completed with respect to the combinations of all the component members, the process returns to Step 114, and the detection of collision between the component members is executed in a similar manner. On the other hand, when the computation of collision detection for the combinations of all the component members has been completed, the operation proceeds to Step 124 in which a determination is made as to whether or not the computation of collision detection has been completed for all the designated objects. If it has not been completed, a determination of collision detection is similarly made between other objects.

If it is determined in Step 124 that the computation of collision detection has been completed for the combinations of all the designated objects, the operation proceeds to Step 126, and the configuration of the robot is computed on the basis of joint angles stored in the joint angle memory 33 at that time. The robot in that configuration and the work environment are displayed. Then, the operation proceeds to Step 128 to determine whether or not all the motions of movement have been completed. If all the motions have not been completed, the operation returns to Step 110 in which the aforementioned collision determination processing is repeatedly executed with respect to an ensuing point of movement. On the other hand, if it is determined that motions have been completed, this program ends.

As described above, the apparatus in accordance with the present invention is capable of readily meeting the two conditions of accuracy and computing speed that are required, so that the apparatus is effective particularly when high-speed collision detection is effected at the time of, for instance, a rough motion of a robot.

In addition, the apparatus in accordance with the present invention can model members having any shape with the same accuracy, and is a highly versatile apparatus which is applicable to both actual robots and offline simulators.

Second Embodiment

A description will now be given of a second embodiment of the present invention.

This embodiment is so designed as to automatically set the number of ranks of a sphere model and the radii of spheres in each rank in such a manner that the efficiency of searching portions where collision occurs is maximized by taking the size of an object, the radius of the smallest sphere, etc. into consideration. A description will be given hereinunder of only those aspects that differ from the first embodiment described above.

In a hierarchical sphere model generating means B, by providing a radius $r_1$ of the largest sphere enveloping an object, a radius rn of the smallest sphere determining the accuracy of collision detection, and a ratio of radius ρr between an upper sphere and a lower sphere, the depth of ranks (number of ranks) n and a radius $r_i$ of a sphere in each rank are respectively calculated by the following Formulae (1) and (2):

$$n = \frac{\log r_1 - \log r_n}{\log \rho_r} + 1 \quad (1)$$

where n is an integer by counting fractions over ½ as one and disregarding the rest.

$$r_i = r_n \times \left(\frac{r_1}{r_n}\right)^{(n-i)/(n-1)} \quad (2)$$

where $i = 1, 2, \ldots, n$.

Here, the process of deriving Formula (1) will be shown below.

If the radius of a sphere in each rank is assured to be $r_i$, a volumetric ratio $\rho_v$ between an upper sphere and a lower sphere (radius $r_{i+1}$) can be expressed by the following Formula (3):

$$\rho_v = \frac{\frac{4}{3} \cdot \pi \cdot r_i^3}{\frac{4}{3} \cdot \pi \cdot r_{i+1}^3} = \left(\frac{r_i}{r_{i+1}}\right)^3 \quad (3)$$

If it is assumed that $\rho_v$ is fixed in each rank, the relation between the radius $r_1$ of the largest sphere and the radius $r_n$ of the smallest sphere can be expressed by the following Formula (4):

$$\frac{4}{3} \cdot \pi \cdot r_1^3 = \frac{4}{3} \cdot \pi \cdot r_n^3 \cdot \rho_v^{n-1} \quad (4)$$

Here, if it is assumed that a ratio of radius between an upper sphere and a lower sphere is $\rho_r$, since $\rho_v = \rho_r^3$ on the basis of Formula (3), Formula (4) can be expressed as the following Formula (5):

$$r_1^3 = r_n^3 \cdot \rho_r^{3(n-1)} \quad (5)$$

By taking a logarithm of the two sides of Formula (5), Formula (1) can be obtained.

In addition, the relation of the following Formula (6) exists in the light of Formula (5):

$$r_i^3 = r_n^3 \cdot \rho_r^{3(n-1)} \quad (6)$$

Therefore, Formula (2) can be derived from Formulae (5) and (6).

In the above description, by fixing the volumetric ratio $\rho_v$ between an upper sphere and a lower sphere, i.e., by providing a relationship that a fixed number of lower spheres are included in an upper sphere, it is possible to uniformalize the number of lower spheres possessed by each sphere in each rank as a whole. Accordingly, it is possible to set the number of ranks ranging from the largest sphere to the smallest spheres and the number of spheres in each rank optimally in terms of searching efficiency.

Furthermore, even if a ratio of area $\rho_s = (r_i/r_{i+1})^2$ between an upper sphere and a lower sphere is fixed, it goes without saying that the relationship in which the ratio of radius $\rho_r$ between an upper sphere and a lower sphere is fixed is applicable.

It should be noted that the ratio of radius $\rho_r$, which is set in correspondence with the size and shape of an object, is set to approximately 2 in this embodiment.

Using the number of ranks n and the radius $r_i$ of a sphere in each rank that are determined as described, a sphere model of an object is generated as described below.

Step 1: A rectangular parallelepiped Rec 1 enveloping an object and a sphere Sph enveloping that rectangular parallelepiped Rec 1 are generated. (hierarchical level k=1)

Figure 10A:
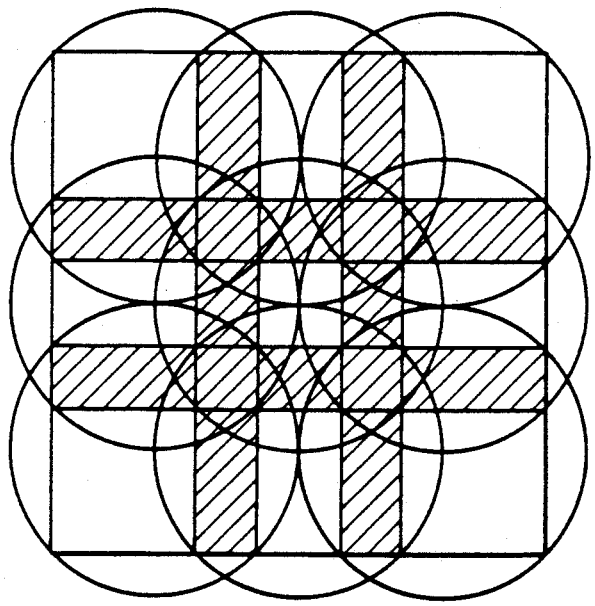
FIGS. 10(a) and 10(b) are diagrams illustrating cubic cells having overlapping portions and rectangular parallelepiped cells with the overlapping portions deleted and spheres enveloping them, respectively.

Step 2: The hierarchical level k is given by k=k+1, and a rectangular parallelepiped Rec k−1 is divided by cubic cells inscribing a sphere having a radius $r_k$ (i.e., cubes having an edge $\sqrt{2}r_k$). Here, since the cubic cells are arranged in such a manner that the edges of the rectangular parallelepiped Rec k−1 and the edges of the cubes agree with each other, the cubic cells, in many cases, overlap with adjacent cells, as shown by hatched portions in FIG. 10(a). These overlapping portions are deleted, as will be described later, and are incorporated as rectangular parallelepiped cells Rec k, j, and Step 3 is executed with respect to all these cells (j=1, 2, ...)

Step 3: A check is made as to whether or not the sphere enveloping the rectangular parallelepiped cell Rec k, j intersects a surface of the object. If it does, that sphere is added to the data of the sphere model, and if k < n (i.e., the hierarchical level k is not the lowermost rank level), Step 2 is further executed with respect to a rectangular parallelepiped Rec k+1.

At this juncture, an explanation will be given of the deletion of the overlapping portions of the cubic cell.

Figure 10B:
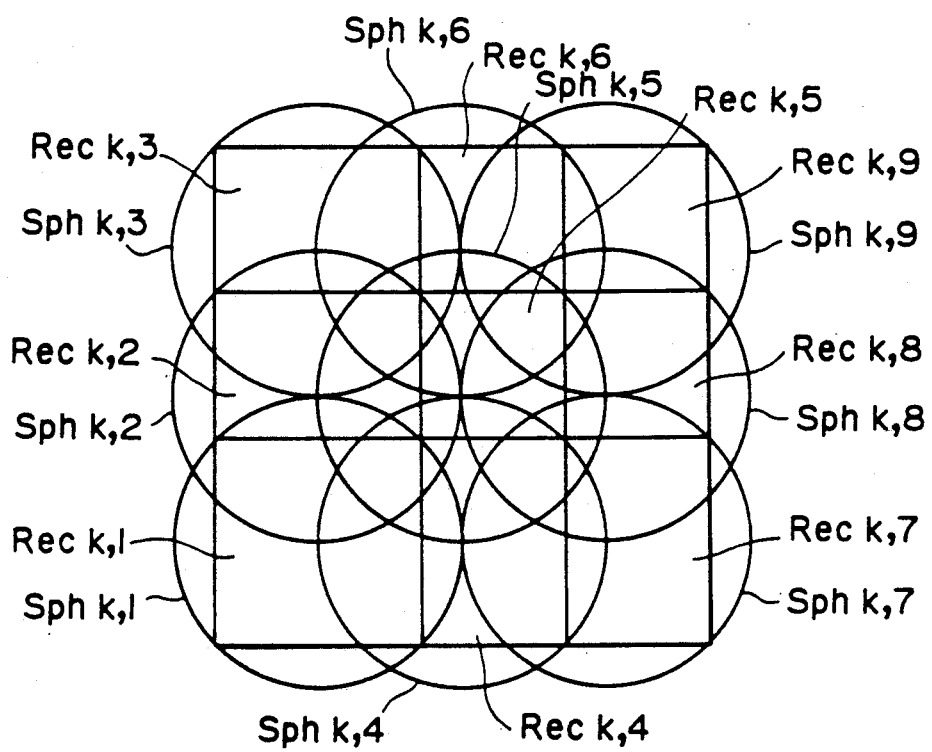

As described above, in each hierarchical level, overlapping portions are added preferentially in the order of generation of lower spheres (i.e., lower cells), and a cell of a lower priority is defined as a rectangular parallelepiped cell excluding overlapping portions. Namely, in FIG. 10(b), in a case where the cubic cell Rec k−1 is divided into rectangular parallelepiped cells Rec k,1−Rec k,9 by nine spheres Sph k,1−Sph k,9 having the radius $r_k$, the, the cubic cell Rec k,1 is determined in such a manner as to inscribe the first sphere Sph k,1, and, with respect to the ensuing sphere Sph k,2, a portion in which portions overlapping with the cubic cell Rec k,1 are excluded in a cube inscribing the sphere Sph k,2 is defined as the rectangular parallelepiped cell Rec k,2. Thereafter, a similar operation is effected consecutively with respect to spheres Sph k,3 to Sph k,9, and the rectangular parallelepiped cells Rec k,1 to Rec k,9 that are respectively free of overlapping portions are defined. Then, in a case where a lower sphere Sph k+1,i is generated, since the aforementioned rectangular parallelepiped cells Rec k,1 to Rec k,9 are divided in the same manner as described above, the overlapping of spheres Sph k+1,i generated at overlapping portions is eliminated, so that the number of sphere data items can be reduced to a minimum. Thus, at the time of describing (modeling) the surfaces of an object, the number of spheres in each rank can be reduced to a necessary minimum, so that the searching efficiency at the time of collision detection does not decline.

A description will be given hereinunder of a recursive algorith whereby a sphere collision computing means B conducts collision detection hierarchically with respect to a hierarchical sphere model in which the number of ranks of objects, X, Y generated as described above are $n_X$, $n_Y$. Although this algorithm can be applied to a case where the aforementioned numbers of ranks are not equal ($n_X \neq n_Y$), this algorithm is basically identical with that of the first embodiment. It should be noted that by "return true/false" referred to in the following steps is meant to return true/false to an immediately preceding step.

Step 1: A mark indicating a possible collision is attached to respective sphere data (a flag is set to 1) with respect to the uppermost spheres (hierarchical level k=1) of the two objects X, Y, and Step 2 is then executed. If the result of true is obtained in Step 2, it is assumed that the objects X and Y are colliding with each other. If not (if the result of false is obtained), it is assumed that the objects X and Y are not colliding with each other.

Step 2: Step 3 is executed with respect to all the combinations of spheres that respectively belong to the objects X, Y and are subject to detection. If the result of Step 3 is true, true is returned. In addition, if there is no combination which becomes true, false is returned.

Step 3: If the mark indicating a possible collision is attached to both sphere data belonging to the objects X, Y in one combination, collision detection is conducted for their spheres. If not, false is returned. If it is found as a result of the detection that the spheres are colliding, Step 4 is executed with respect to those two spheres. If a collision is not taking place, false is returned. In addition, if the result of Step 4 is true, true is returned and, if false, false is returned.

Step 4: If the two spheres are of the lowermost level ($n_X$, $n_Y$), a determination is made that the objects X and Y are colliding with each other, and true is returned. If not, if either one of the spheres belonging to the object X or Y is of the lowermost level, Step 5 is executed, while, if neither of the spheres is of the lowermost level, Step 6 is executed. If the results of Steps 5 and 6 are true, true is returned and, if false, false is returned.

Step 5: Collision detection is carried out with respect to all the combinations between a lowermost-level sphere belonging to either one of the objects X, Y on the one hand, and a sphere in a rank one level below a sphere which belongs to the other object and is not of the lowermost level on the other. If a collision is present, Step 4 is executed. If no colliding sphere is found to exist, false is returned. If the result of Step 4 is true, true is returned and, if false, false is returned. At this stage, all the marks are cleared by resetting the flags (the flags are set to 0), so that the operation can be immediately restarted beginning with Step 1 for the next detection of collision between objects.

Step 6: The detection of collision between spheres is conducted with respect to all the combinations of one sphere belonging to the object X on the one hand, and a plurality of spheres in a rank one level below a sphere belonging to the object Y. If a collision is present, a mark is attached to data on spheres in a rank one level below a sphere belonging to the object Y. If no sphere with the mark attached thereto is present, false is returned. A similar processing is conducted to all the combinations between one sphere belonging to the object Y on the one hand, and a plurality of spheres in a rank one level below a sphere belonging to the object X. Thus, spheres that have the possibility of colliding with upper-level spheres are selected by gradually lowering the hierarchical level with respect to the spheres of the object X and the spheres of the object Y. Then, if a sphere with the mark attached thereto is present, Step 2 is carried out with respect to all the combinations. If the result of Step 2 is true, true is returned and, if false, false is returned. At this juncture, all the marks are cleared (the flags are set to 0) in the same way as Step 5.

Next, the procedures of processing by CPU for determining a collision according to the above-mentioned algorithm will be described with reference to FIGS. 12(a) and (b).

Figures 1, 12A:
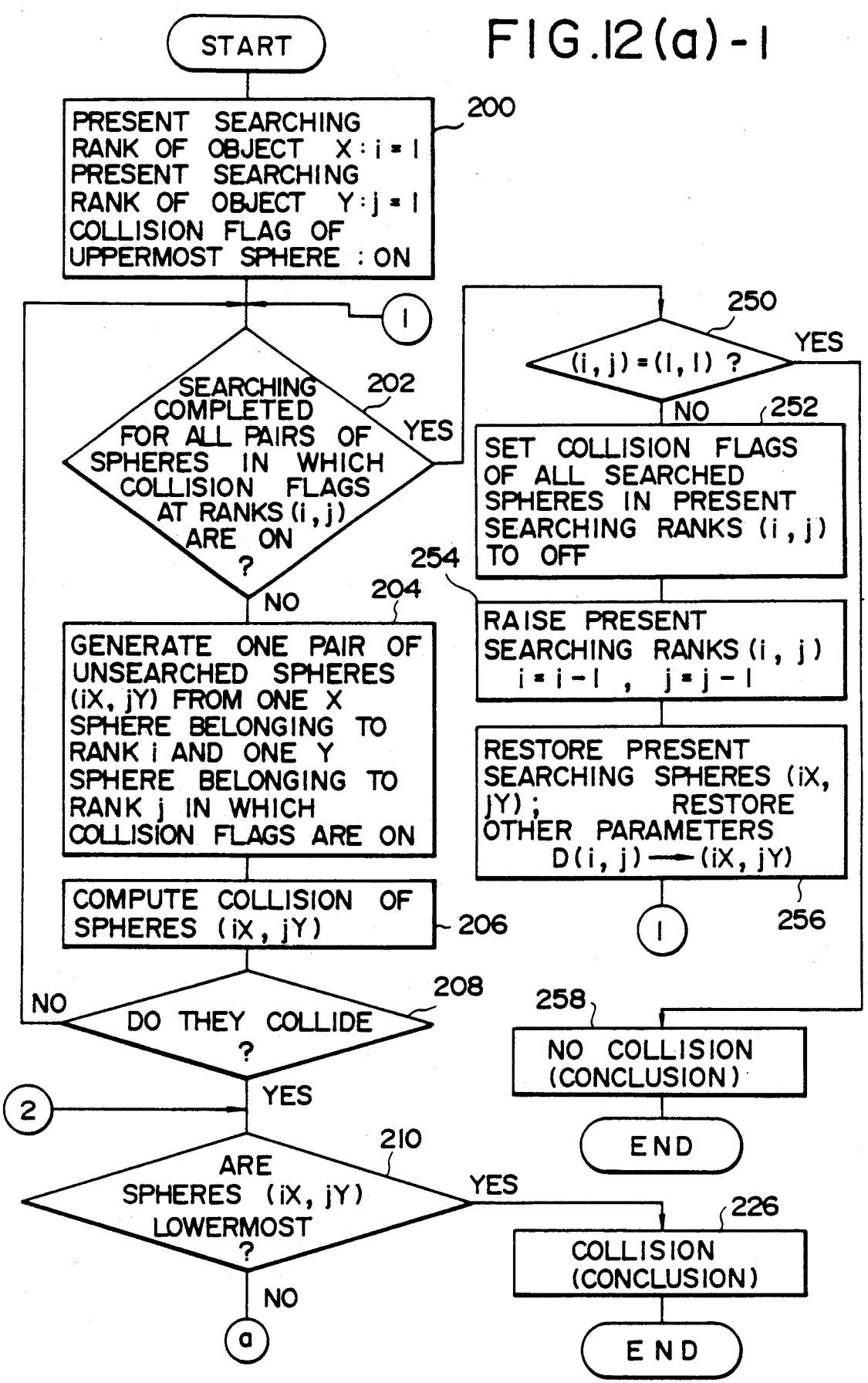
Figures 2, 12A:
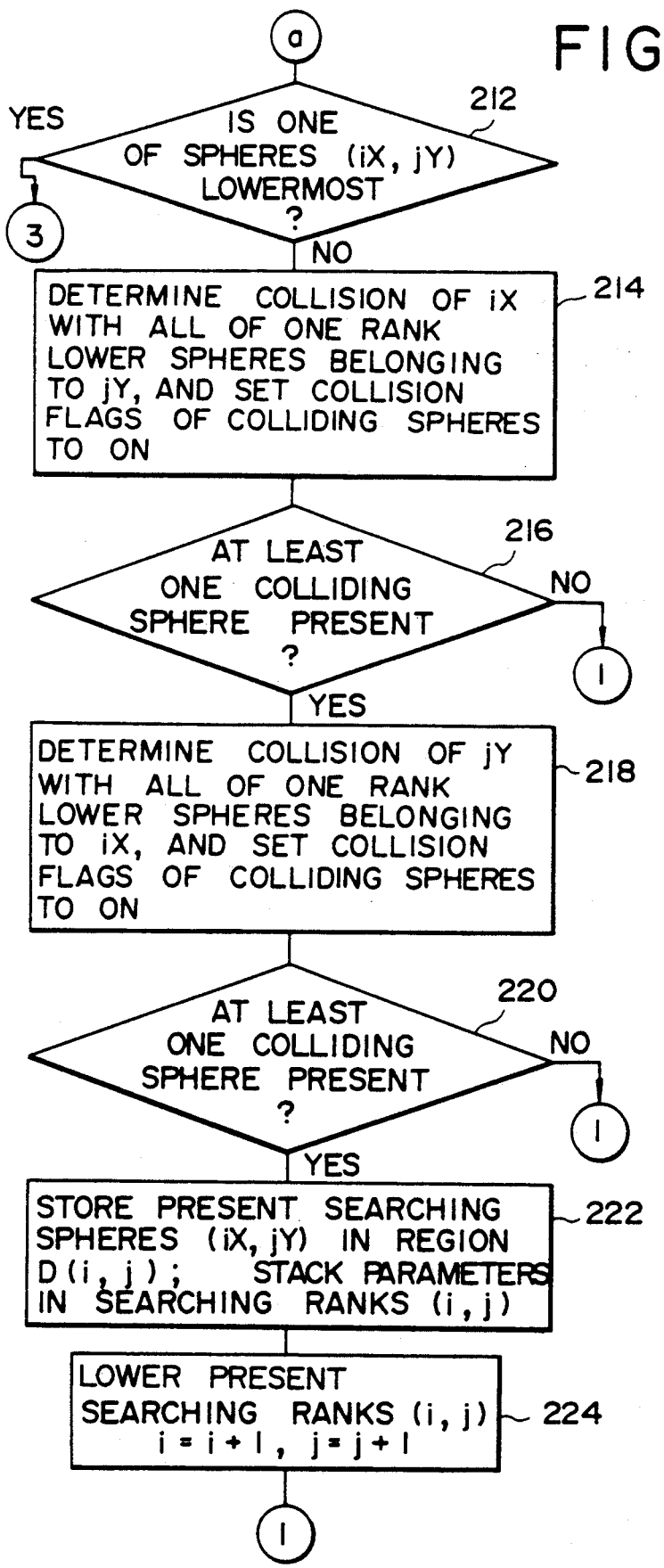
Figure 12A:
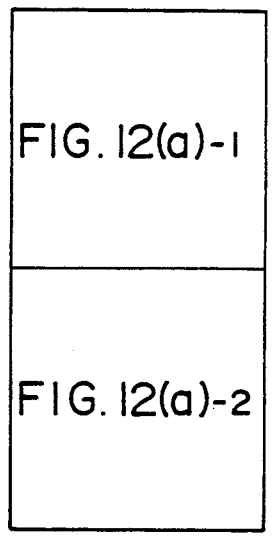

In FIGS. 12(a) and (b), ranks of the present detected pair of spheres (iX, jY) for objects X and Y are defined as present searching ranks (i, j). Namely, when the collision computation between a parent sphere iX and one rank lower spheres belonging to a parent sphere jY is executed, the present searching ranks (i, j) are defined as the ranks to which the parent spheres iX and jY belong respectively. The present searching pair of spheres (iX, jY) are defined as the presently noted parent spheres iX and jY.

(a) In case where the number of ranks is the same between hierarchical spheres X and Y:

The processing of Steps 200 to 226 and 250 to 258 shown in FIG. 12(a) leads to a conclusion concerning the presence of collision between two objects X and Y.

Namely, if the Steps 202 to 224 are repeated without branching, a branch for searching colliding spheres stretches toward the lower ranks by the shortest process with respect to both of spheres X and Y. On the other hand, if the branching occurs, the searching branch returns to the upper rank, stretches horizontally there, and goes to the lower rank again.

For example, in Step 208, if it is determined that spheres (iX, jY) do not collide with each other, the proceeding returns to Step 202 and then the other unsearched spheres (iX, jY) are generated in Step 204. In Step 216 or 220, if it is determined that there is no collision between a parent sphere and child spheres belonging to the other parent sphere, it is unnecessary to search toward the lower rank from the parent spheres. Therefore, in this case, the proceeding returns to Step 202 and then the other unsearched spheres (iX, jY) are generated in Step 204.

When it is determined that all spheres belonging to the present searching rank (i, j) in which collision flags are on have been searched, the proceeding turns to Step 250. In Step 250, it is determined whether the present searching rank (i, j) is the uppermost rank (1, 1) or not. When the result of determination is NO, the present searching rank (i, j) is raised to one rank upper rank in Step 254. In Step 256, the data of the present searching rank in the upper rank which has been stored in Step 222 is restored when the proceeding returns from the lower to the upper rank.

In Step 250, when the result of determination is YES, it means that the uppermost rank spheres do not collide with each other, and therefore it is concluded that objects X and Y do not collide with each other in Step 258.

On the other hand, when both of the colliding spheres iX and jY are the lowermost spheres in Step 210, it is concluded in Step 226 that objects X and Y collide with each other.

Figure 12B:
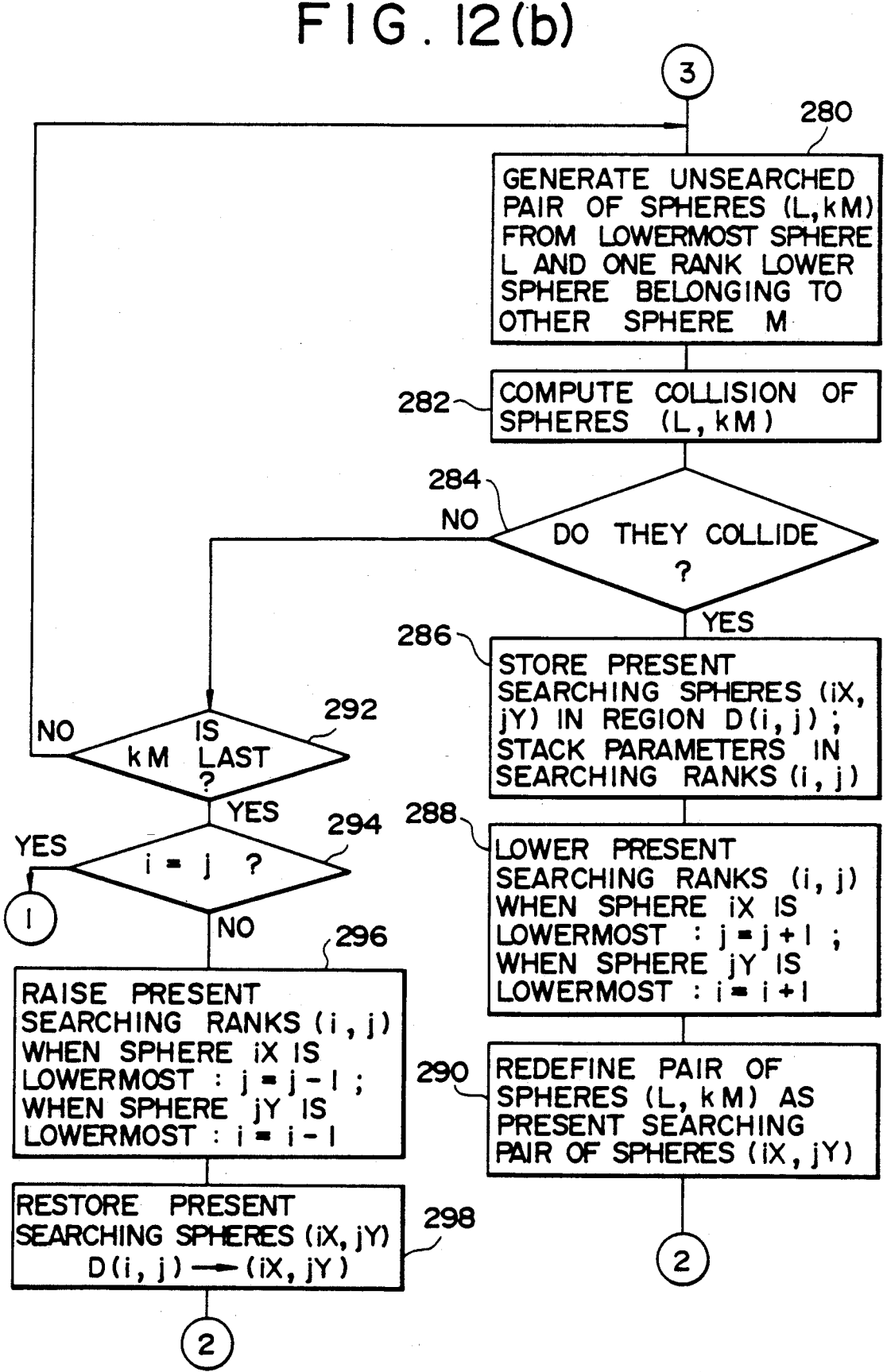

(b) In case where the number of ranks is different between hierarchical spheres X and Y:

Steps 200 to 224 and 250 to 258 shown in FIG. 12(a) are executed until any one of the present searching spheres (iX, jY) reaches the lowermost rank. If it is determined that one of the spheres is in the lowermost rank in Step 212, Steps 280 to 298 shown in FIG. 12(b) are executed, and the searching branch for the other sphere stretches to the lower rank. In Step 280, when the lowermost sphere in the present searching spheres (iX, jY) is defined as L and the opposite sphere is defined as M, unsearched spheres (L, kM) are generated by selecting the sphere L and the one rank lower sphere belonging to the opposite sphere M, i.e. one child sphere kM (k is a variable changing in accordance with the child sphere).

In Step 292, it is determined whether a child sphere kM is the last of the spheres belonging to a parent sphere M or not. If kM is the last, a parent sphere L does not collide with the parent sphere M. Then, when it is determined that a rank i is equal to a rank j in Step 294, the other spheres belonging to the same ranks (i, j) are generated after the proceeding returns to Step 202. When the rank i is not equal to the rank j, the sphere belonging to the parent sphere M of the present searching rank is raised to one rank upper rank in Step 296. In Step 298, the data stored in Step 286 is restored as the updated present searching rank.

As mentioned above, only the possible colliding spheres are searched toward the lower ranks, thus much increasing the searching speed.

The sphere collision computing means for the above procedures of FIGS. 12(a) and (b) may comprise the following means for determining the collision of the two objects:

(a) means for selecting each pair of unsearched spheres for the two objects among present searching spheres, said pair belonging to the same rank or one sphere belonging to a lowermost rank and the other belonging to a rank other than the lowermost rank, for determining the collision between said pair of spheres, and for outputting colliding pair of spheres or further searching colliding pair of spheres in a one rank upper rank than the present searching rank when no collision is searched with respect to all pairs of such spheres; and (b) means for determining the collision between one sphere of said outputted colliding pair of spheres and a plurality of spheres in a one rank lower rank belonging to the other sphere of said outputted pair of spheres, and for detecting and storing colliding spheres among said plurality of spheres, or further searching colliding pair of spheres in a one rank upper rank than the present searching rank when no collision is searched with respect to all of said plurality of spheres.

Figure 11:
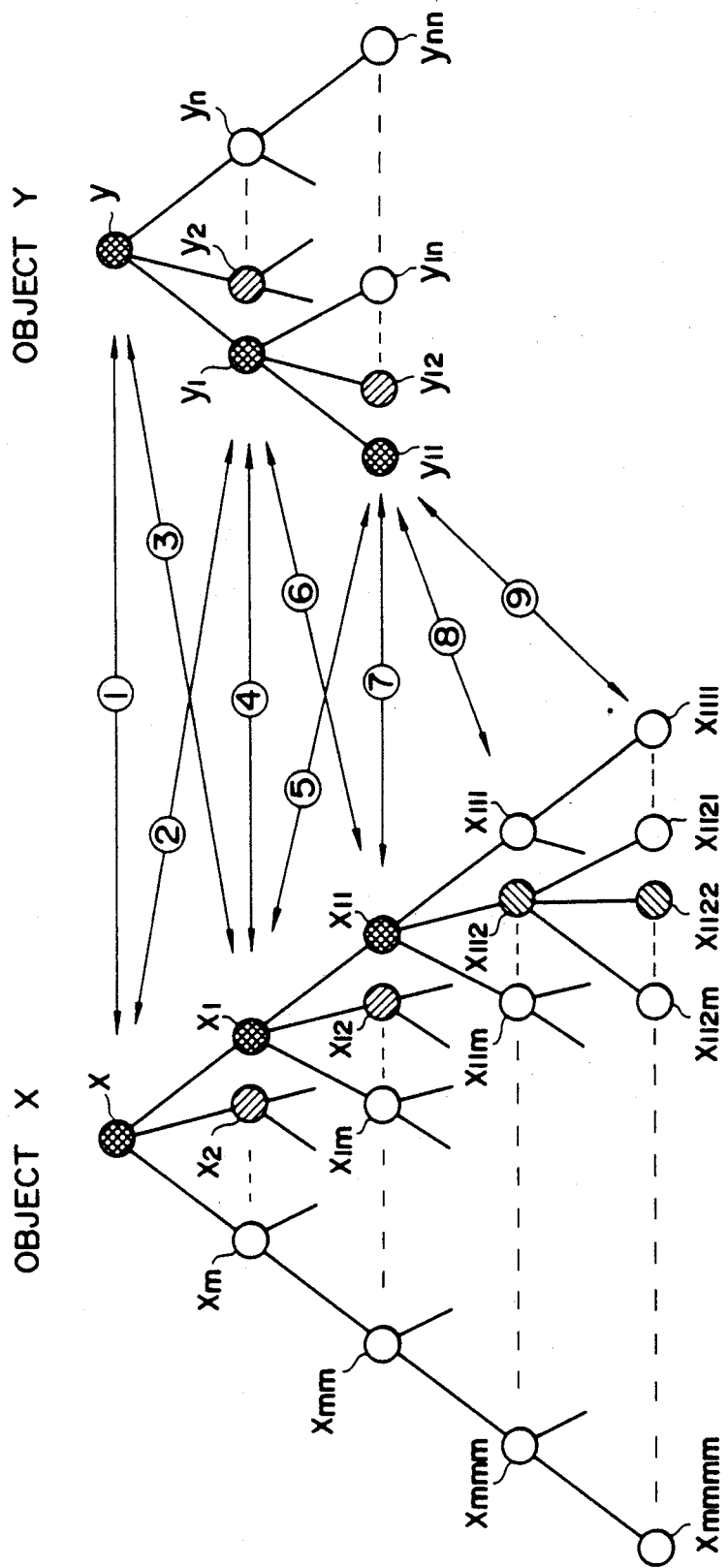
FIG. 11 is an explanatory diagram illustrating collision detection between two sphere models having a different number of ranks.

Referring now to an example shown in FIG. 11, a description will be given hereinunder of the procedures of searching spheres that have a collision by using the above-described algorithm. FIG. 11 shows a case in which the object X and the object Y are expressed as a hierarchical spherical model with the former having five ranks and the latter having three ranks, and illustrates the relationship between the respective ranks ranging from an uppermost sphere (a sphere x in the case of the object X and a sphere y in the case of the object Y) to lowermost spheres (spheres x1111, . . . , xmmmm in the case of the object X and spheres y11, . . . , ynn in the case of the object Y) in the same way as FIG. 8. It should be noted that, in the drawing, the respective circles are shown unrelated to the radii of the spheres in each rank. In addition, numerals (1) to (9) in the drawing indicate the procedures of detecting collision between the spheres of the objects and correspond to the items of description that follow. Furthermore, by "collision detection of (x, y)" is meant to conduct the detection of collision between the sphere x and the sphere y.

First, in executing the detection of collision between the objects X and Y, a mark indicating a possible collision is attached to x and y, respectively.

(1) Since a collision is found to exist as a result of the collision detection of (x, y), it is determined that x and y are in a colliding state.

(2) Collision detection is conducted for all the combinations between x found to be in a colliding state on the one hand, and y1, y2, . . . , yn that are of a lower level, i.e., (x, y1), (x, y2), . . . , (x, yn). Since a collision is found to exist between x and y1 and between x and y2 as a result of the detection, the mark is attached to y1 and y2.

(3) Similarly, the mark is attached to x1, x2 that are found to be in a colliding state as a result of conducting collision detection for all the combinations between y and x1, x2, . . . , xm of a lower level.

(4) As a result of conducting collision detection for all the combinations of spheres with the mark attached thereto, i.e., (x1, y1), (x1, y2), (x2, y1), (x2, y2), a collision is found to exist between x1 and y1, so that x1 and y1 are determined to be in a colliding state. Namely, collision detection is not carried out between x3, . . . , xm and y3, . . . , yn that are not provided with the mark.

(5) In the same way as (2), the mark is attached to y11 and y12 that are found to be in a colliding state as a result of conducting collision detection for all the combinations between x1 on the one hand, and y11, y12, . . . , y1n of the level lower than y1 on the other, with respect to x1, y1 that are found to be in a colliding state.

(6) In the same way as (3), the mark is attached to x11 and x12 that are found to be in a colliding state as a result of conducting collision detection for all the combinations between y1 on the one hand, and x11, x12, . . . , x1m of the level lower than x1 on the other, with respect to x1, y1 that are found to be in a colliding state.

(7) It is determined that x11, y11 are in a colliding state since a collision is found to exist between x11 and y11 as a result of collision detection of all the combinations of the spheres with the mark attached thereto, i.e., (x11, y11), (x11, y12), (x12, y11), (x12, y12). Incidentally, since y11 is a sphere of the lowermost level of the object Y, y11 is treated as the object sphere for subsequent detection with respect to the object Y.

(8) With respect to x11, y11 found to be in a colliding state, collision detection is consecutively conducted with respect to all the combinations between y11 and x111, x112, . . . , x11m of the level lower than x11. Since no collision exists between x111 and y11, collision detection is then carried out for (x112, y11). As a result, since a collision is found to exist between x112 and y11, x112 is determined to be in a colliding state, and the objects for detection are shifted to spheres of the level lower than x112 by bypassing x113.

(9) Since no collision is found to exist between y11 and x1121 of the level lower than x112, collision detection is then conducted with respect to (x1122, y11). As a result, since it is found that a collision is taking place between x1122 and y11, x1122 is determined to be in a colliding state. Since x1122 is a sphere of the lowermost level, processing is ended at this juncture, and collision detection is not conducted with respect to a next sphere x1123 irrespective of the presence of a collision.

Thus, it is immediately determined that the object X and the object Y are colliding with each other at the portions where the sphere x1122 and the sphere y11 are present.

However, in a case where it is desired to ascertain the presence of collision with respect to all the portions of an object, it suffices if collision detection is conducted with respect to the combinations between y11 and all of the spheres x113, . . . , x11m which were excluded from the objects of detection in item (8).

As described above, since collision detection is conducted with respect to only the spheres provided with the mark indicating a possible collision by means of detection for combinations of a sphere belonging to one object and a upper-level sphere belonging to the other object, it is possible to extremely reduce the number of combinations of spheres subject to detection. Accordingly, it is possible to enhance the efficiency of collision detection between objects by a remarkable degree.

What is claimed is:

1. An apparatus for detecting the collision of objects including at least one moving object, comprising:

face information storing means for storing face information describing the surfaces of each of said objects;

hierarchical sphere model generating means for modeling the surfaces of each of said objects by hierarchically arranging spheres having a plurality of radii uniformly over all of the surfaces of each object on the basis of said face information;

sphere model storing means for storing the positions of said modeled spheres generated;

sphere position updating means for updating the position of each of said modeled spheres having said plurality of radii with respect to said moving object in correspondence with the movement of said moving object and outputting said updated position to said sphere model storing means; and sphere collision computing means for executing procedures in which mutually colliding ones of said spheres are detected on the basis of the positions of said modeled spheres concerning two of said objects generated at an arbitrary time and stored in said sphere model storing means, and colliding spheres among spheres belonging to said mutually colliding spheres and having a smaller radius are further detected with respect to only said spheres determined to collide with each other, said procedures being executed hierarchically and consecutively starting with spheres having a large radius toward spheres having a smaller radius, and for determining the collision of said two objects with each other when finally mutually colliding spheres having the smallest radius are present.

2. The apparatus according to claim 1, wherein said hierarchical sphere model generating means comprises means for modeling the surfaces of each of said objects by hierarchically covering said surfaces with spheres having a predetermined number of ranks and having a different radius for each rank on the basis of the face information.

3. The apparatus according to claim 2, wherein said hierarchical sphere model generating means comprises means for determining radii of spheres in each rank and the number of ranks on the basis of a radius of an uppermost rank sphere circumscribing the objects, a radius of a lowermost rank sphere determining an accuracy of a collision detection and a ratio of radius between an upper rank sphere and a lower rank sphere.

4. The apparatus according to claim 3, wherein said hierarchical sphere model generating means comprises means for determining said radii $r_i$ of spheres in each rank covering the surfaces of the objects and the number of ranks n on the basis of the radius $r_1$ of the uppermost rank sphere, the radius $r_n$ of the lowermost rank sphere and the ratio of radius $\rho_r$ by the following formulae:

$$n = \frac{\log r_1 - \log r_n}{\log \rho_r} + 1$$

(n is an integer by counting fractions over $\frac{1}{2}$ as one and disregarding the rest); and $$r_i = r_n \times \left(\frac{r_1}{r_n}\right)^{(n-i)/(n-1)}.$$

5. The apparatus according to claim 1, wherein said hierarchical sphere model generating means comprises means for determining radii of spheres in medium ranks between an uppermost rank and a lowermost rank on the basis of a radius of the uppermost rank sphere circumscribing the objects and a radius of the lowermost rank smallest sphere which determines a predetermined accuracy of a collision detection, and hierarchically arranging the spheres so that the larger spheres include the smaller spheres and the surfaces of the objects.

6. The apparatus according to claim 5, wherein said hierarchical sphere model generating means comprises:

means for generating a rectangular parallelepiped-shaped envelope cell enveloping the object on the basis of the face information outputted from said face information storing means and generating an uppermost rank sphere circumscribing said envelope cell;

means for determining the radii of spheres in medium ranks on the basis of the radius of the uppermost rank largest sphere and the radius of the lowermost rank smallest sphere;

means for extracting a radius in the order of larger to smaller radii among said determined radii of said medium rank spheres and said radius of the lowermost rank sphere;

means for dividing a cell inscribing an upper rank sphere having the larger radius into a plurality of cubic cells inscribing the spheres having said extracted radius; and means for generating spheres circumscribing said divided cubic cells respectively, extracting only such spheres that intersect with the surfaces of the objects among said generated spheres, and generating said extracted spheres as lower rank spheres with respect to said upper rank sphere.

7. The apparatus according to claim 6, wherein said hierarchical sphere model generating means comprises means for dividing said cell inscribing the upper rank sphere having the larger radius into said plurality of cubic cells having overlapping portions between the adjacent cells.

8. The apparatus according to claim 7, wherein said hierarchical sphere model generating means comprises means for dividing each cell in which said overlapping portions are deleted into a plurality of smaller cubic cells. inscribing the spheres in a lower rank than that of the spheres having said extracted radius and having overlapping portions between the adjacent cells.

9. The apparatus according to claim 1, wherein said sphere collision computing means comprises:

means for selecting each pair of spheres to be searched for the two objects among present searching spheres, said pair belonging to the same rank or one sphere belonging to a lowermost rank and the other belonging to a rank other than the lowermost rank, determining the collision between said pair of spheres, and outputting colliding pair of spheres or further searching colliding pair of spheres in a one rank upper rank than the present searching rank when no collision is searched with respect to all pairs of such spheres; and means for determining the collision between one sphere of said outputted colliding pair of spheres and a plurality of spheres in a one rank lower rank belonging to the other sphere of said outputted pair of spheres, and detecting and storing colliding spheres among said plurality of spheres, or further searching colliding pair of spheres in a one rank upper rank than the present searching rank when no collision is searched with respect to all of said plurality of spheres.

10. The apparatus according to claim 1, wherein the spheres having a large radius encompass spheres having a smaller radius.

11. The apparatus according to claim 1, wherein said hierarchical sphere model generating means comprises means for uniformly dividing the surfaces of said objects into cells on the basis of said face information and uniformly dividing each of said cells into smaller cells to represent said surfaces with hierarchically divided cells and for generating spheres circumscribing the respective hierarchically divided cells.

12. An apparatus for detecting the collision of objects including at least one moving object, comprising:

face information storing means for storing face information describing the surfaces of each of said objects;

hierarchical sphere model generating means for modeling the surfaces of each of said objects by hierarchically covering said surfaces with spheres having a plurality of radii on the basis of said face information;

sphere model storing means for storing the positions of said modeled spheres generated;

sphere position updating means for updating the position of each of said modeled spheres having said plurality of radii with respect to said moving object in correspondence with the movement of said moving object and outputting said updated position to said sphere model storing means; and sphere collision computing means
for executing procedures in which mutually colliding ones of said spheres are detected on the basis of the positions of said modeled spheres concerning two of said objects generated at an arbitrary time and stored in said sphere model storing means, and colliding spheres among spheres belonging to said mutually colliding spheres and having a smaller radius are further detected with respect to only said spheres determined to collide with each other, said procedures being executed hierarchically and consecutively starting with spheres having a large radius toward spheres having a smaller radius, and for determining the collision of said two objects with each other when finally mutually colliding spheres having the smallest radius are present;

wherein said hierarchical sphere model generating means comprises means for modeling the surfaces of each of said objects by hierarchically covering said surfaces with spheres having a predetermined number of ranks and having a different radius for each rank on the basis of the face information;

means for determining radii of spheres in each rank and the number of ranks on the basis of a radius of an uppermost rank sphere circumscribing the objects, a radius of a lowermost rank sphere determining an accuracy of a collision detection and a ratio of radius between an upper rank sphere and a ratio of radius between an upper rank sphere and a lower rank sphere; and means for determining said radii $r_i$ of spheres in each rank covering the surfaces of the objects and the number of ranks n on the basis of the radius $r_i$ of the uppermost rank sphere, the radius $r_n$ of the lowermost rank sphere and the ratio of radius $\rho_r$ by the following formulae;

$$n = \frac{\log r_1 - \log r_n}{\log \rho_r} + 1$$

(n is an integer by counting fractions over $\frac{1}{2}$ as one and disregarding the rest); and $$r_i = r_n \times \left(\frac{r_1}{r_n}\right)^{(n-i)/(n-1)}$$

13. An apparatus for detecting the collision of objects including at least one moving object, comprising:

face information storing means for storing face information describing the surfaces of each of said objects;

hierarchical sphere model generating means for modeling the surface of each of said objects by hierarchically covering said surfaces with spheres having a plurality of radii on the basis of said face information;

sphere model storing means for storing the positions of said modeled spheres generated;

sphere position updating means for updating the position of each of said modeled spheres having said plurality of radii with respect to said moving object in correspondence with the movement of said moving object and outputting said updated position to said sphere model storing means; and sphere collision computing means
for executing procedures in which mutually colliding ones of said spheres are detected on the basis of the positions of said modeled spheres concerning two of said objects generated at an arbitrary time and stored in said sphere model storing means, and colliding spheres among spheres belonging to said mutually colliding spheres and having a smaller radius are further detected with respect to only said spheres determined to collide with each other, said procedures being executed hierarchically and consecutively starting with spheres having a large radius toward spheres having a smaller radius, and for determining the collision of said two objects with each other when finally mutually colliding spheres having the smallest radius are present;

wherein said hierarchical sphere model generating means comprises means for determining radii of spheres in medium ranks between an uppermost rank and a lowermost rank on the basis of a radius of the uppermost rank sphere circumscribing the objects and a radius of the lowermost rank smallest sphere which determines a predetermined accuracy of a collision detection, and hierarchically arranging the spheres so that the larger spheres include the smaller spheres and the surfaces of the objects; and means for generating a rectangular parallelepiped-shaped envelope cell enveloping the object on the basis of the face information outputted from said face information storing means and generating an uppermost rank sphere circumscribing said envelope call;

means for determining the radii of spheres in medium ranks on the basis of the radius of the uppermost rank largest sphere and the radius of the lowermost rank smallest sphere;

means for extracting a radius in the order of larger to smaller radii among said determined radii of said medium rank spheres and said radius of the lowermost rank sphere;

means for dividing a cell inscribing an upper rank sphere having the larger radius into a plurality of cubic cells inscribing the spheres having said extracted radius; and means for generating spheres circumscribing said divided cubic cells respectively, extracting only such spheres that intersect with the surfaces of the objects among said generated spheres, and generating said extracted spheres as lower rank spheres with respect to said upper rank sphere.

14. The apparatus according to claim 13, wherein said hierarchical sphere model generating means comprises means for dividing said cell inscribing the upper rank sphere having the larger radius into said plurality of cubic cells having overlapping portions between the adjacent cells.

15. The apparatus according to claim 14, wherein said hierarchical sphere model generating means comprises means for dividing each cell in which said overlapping portions are deleted into a plurality of smaller cubic cells inscribing the spheres in a lower rank than that of the spheres having said extracted radius and having overlapping portions between the adjacent cells.

16. An apparatus for detecting the collision of objects including at least one moving object, comprising:

face information storing means for storing face information describing the surfaces of each of said objects;

hierarchical sphere model generating means for modeling the surfaces of each of said objects by hierarchically covering said surfaces with spheres having a plurality of radii on the basis of said face information;

sphere model storing means for storing the positions of said modeled spheres generated;

sphere position updating means for updating the position of each of said modeled spheres having said plurality of radii with respect to said moving object in correspondence with the movement of said moving object and outputting said updated position to said sphere model storing means; and sphere collision computing means for executing procedures in which mutually colliding ones of said spheres are detected on the basis of the positions of said modeled spheres concerning two of said objects generated at an arbitrary time and stored in said sphere model storing means, and colliding spheres among spheres belonging to said mutually colliding spheres and having a smaller radius are further detected with respect to only said spheres determined to collide with each other, said procedures being executed hierarchically and consecutively starting with spheres having a large radius toward spheres having a smaller radius, and for determining the collision of said two objects with each other when finally mutually colliding spheres having the smallest radius are present;

wherein said sphere collision computing means comprises:

means for selecting each pair of spheres to be searched for the two objects among present searching spheres, said pair belonging to the same rank or one sphere belonging to a lowermost rank and the other belonging to a rank other than the lowermost rank, determining the collision between said pair of spheres, and outputting colliding pair of spheres or further searching colliding pair of spheres in a one rank upper rank than the present searching rank when no collision is searched with respect to all pairs of such spheres; and means for determining the collision between one sphere of said outputted colliding pair of spheres and a plurality of spheres in a one rank lower rank belonging to the other sphere of said outputted pair of spheres, and detecting and storing colliding spheres among said plurality of spheres, or further searching colliding pair of spheres in a one rank upper rank than the present searching rank when no collision is searched with respect to all of said plurality of spheres.

* * * * *

UNITED STATES PATENT AND TRADEMARK OFFICE
CERTIFICATE OF CORRECTION

PATENT NO. : 5,056,031
DATED : October 8, 1991
INVENTOR(S) : Masaru Nakano et al.

It is certified that error appears in the above-identified patent and that said Letters Patent is hereby corrected as shown below:

On Title page, item [30];
The second priority data has been omitted, should be,

--October 21, 1989  [JP]  Japan.................1-274748--.

Signed and Sealed this

Ninth Day of March, 1993

Attest:

STEPHEN G. KUNIN

*Attesting Officer*     *Acting Commissioner of Patents and Trademarks*

UNITED STATES PATENT AND TRADEMARK OFFICE
CERTIFICATE OF CORRECTION

PATENT NO. : 5,056,031
DATED : October 8, 1991
INVENTOR(S) : Masaru Nakano et al It is certified that error appears in the above-identified patent and that said Letters Patent is hereby corrected as shown below:

Title page, item [73], "Kenyusho" should read --Kenkyusho--.

--Column 20, delete line 7--.

--Column 20, line 11, change "$r_i$" to --$r_1$--.

--Column 21, line 10, change "call" to --cell--.

Signed and Sealed this

Eleventh Day of May, 1993

Attest:

MICHAEL K. KIRK

*Attesting Officer*   *Acting Commissioner of Patents and Trademarks*